(12) United States Patent
Muthusrinivasan

(10) Patent No.: US 8,880,467 B1
(45) Date of Patent: Nov. 4, 2014

(54) SMART SYNC—REFRESHING APPLICATION STATE BASED ON USER MIGRATION PATTERNS

(75) Inventor: Muthuprasanna Muthusrinivasan, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 12/815,110

(22) Filed: Jun. 14, 2010

Related U.S. Application Data

(60) Provisional application No. 61/318,039, filed on Mar. 26, 2010.

(51) Int. Cl.
*G06F 7/00* (2006.01)
*G06F 17/30* (2006.01)

(52) U.S. Cl.
CPC .... *G06F 17/30132* (2013.01); *G06F 17/30147* (2013.01); *G06F 17/30867* (2013.01); *G06F 17/30997* (2013.01)
USPC .......................................................... 707/632

(58) Field of Classification Search
CPC .......... G06F 17/3012; G06F 17/30147; G06F 17/30867; G06F 17/30997
See application file for complete search history.

(56) References Cited

U.S. PATENT DOCUMENTS

| | | | |
|---|---|---|---|
| 6,631,451 B2 | 10/2003 | Glance et al. | |
| 6,701,316 B1 | 3/2004 | Li et al. | |
| 7,480,698 B2 * | 1/2009 | Potter | 709/217 |
| 7,970,860 B2 * | 6/2011 | Kline et al. | 709/217 |
| 2005/0114511 A1 * | 5/2005 | Davis et al. | 709/226 |
| 2012/0131095 A1 * | 5/2012 | Luna et al. | 709/203 |

OTHER PUBLICATIONS

Qu et al., "Preference-Aware Query and Update Scheduling in Web-databases", ICDE 2007, 2007 IEEE 23rd International Conference on Data Engineering, Apr. 15-20, 2007, Istanbul, Turkey, pp. 356-365.*

Olston et al., "Best-Effort Cache Synchronization with Source Cooperation", Proceedings of the 2002 ACM SIGMOD International Conference on Management of Data, 2002, ACM.*

Bright et al., "Adaptive Pull Based Policies for Wide Area Data Delivery", ACM Transactions on Database Systems, vol. 31, No. 2, pp. 631-671, 2006, ACM.*

Saygin et al., "Exploiting Data Mining Techniques for Broadcast Data in Mobile Computing Environments", IEEE Transactions on Knowledge and Data Engineering, vol. 14, No. 16, pp. 1387-1399, Nov./Dec. 2002, IEEE.*

Cao, "Proactive Power-Aware Cache Management for Mobile Computing Systems", IEEE Transactions on Computers, vol. 51, No. 6, pp. 608-621, Jun. 2002, IEEE.*

Barbara et al., "Sleepers and Workaholics: Caching Strategies in Mobile Environments (Extended Version)", VLDB Journal, vol. 4, pp. 567-602, 1995, VLDB.*

(Continued)

*Primary Examiner* — Michael Hicks
(74) *Attorney, Agent, or Firm* — Sterne, Kessler, Goldstein & Fox P.L.L.C.

(57) ABSTRACT

A method of synchronizing data is provided. An embodiment of the method includes receiving, at a server, information identifying a detected user interaction with a device, determining, at the server, a probability that a user will access a service provided by the server using the device at a time, and generating, at the server, a session signature based on the determined probability, wherein the session signature is used by the device to generate refresh requests associated with the service.

17 Claims, 22 Drawing Sheets

(56) References Cited

OTHER PUBLICATIONS

Franklin et al., "Dissemination-Based Information Systems", Bulletin of the Technical Committee on Data Engineering, vol. 19, No. 3, pp. 19-28, 1996, IEEE.*

Shen et al., "Energy-Efficient Caching and Prefetching with Data Consistency in Mobile Distributed Systems", Proceedings of the 18th International Parallel and Distributed Processing Symposium, IEEE, 2004.*

Choi et al., "Predictive Prefetching of Context-Aware Information in Mobile Networks", EUC Workshops 2006, LNCS 4097, pp. 919-927, 2006, IFIP International Federation for Information Processing 2006.*

Fang, Yuguang, "Movement-Based Mobility Management and Trade Off Analysis for Wireless Mobile Networks", IEEE Transactions on Computers, vol. 52, No. 6, Jun. 2003, pp. 791-803.

Qu, Huiming et al., "Preference-Aware Query and Update Scheduling in Web-databases", ICDE 2007, 2007 IEEE $23^{rd}$ International Conference on Data Engineering, Apr. 15-20, 2007, Istanbul, Turkey, pp. 356-365.

Olston, Chris et al., "Best-Effort Cache Synchronization with Source Cooperation," Proceedings of the 2002 ACM SIGMOD, International Conference on Management of Data, 2002, ACM.

\* cited by examiner

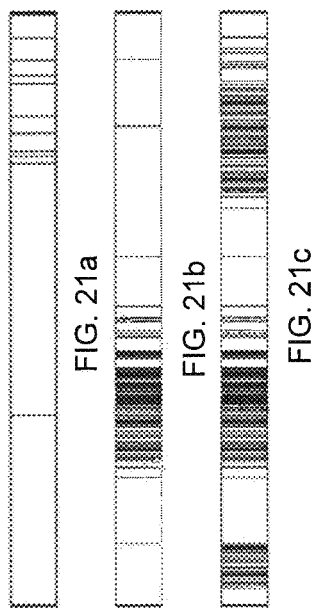

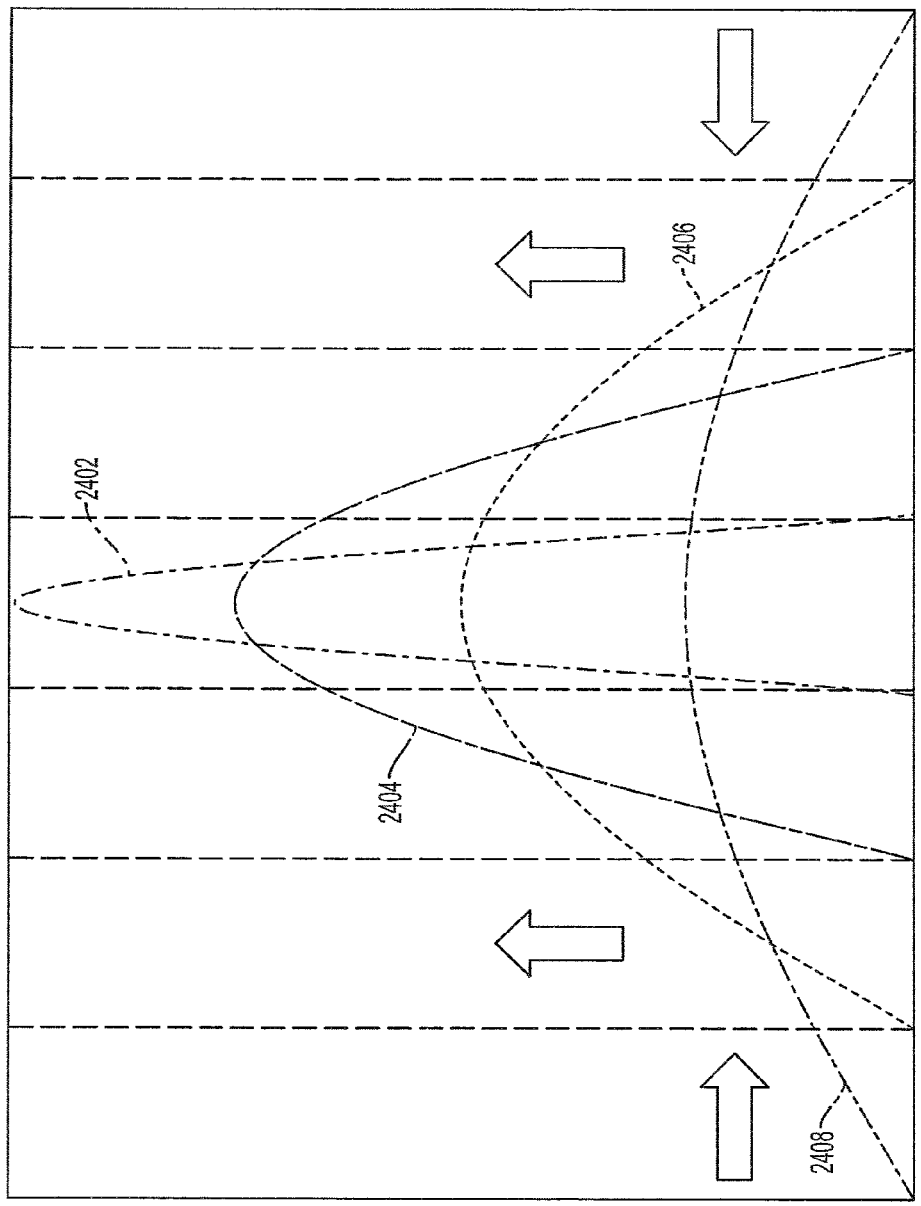

SMART SYNC—REFRESHING APPLICATION STATE BASED ON USER MIGRATION PATTERNS

CROSS REFERENCE TO RELATED APPLICATIONS

This application claims the benefit of U.S. Provisional Appl. No. 61/318,039, filed Mar. 26, 2010, which is incorporated by reference herein in its entirety.

BACKGROUND

1. Field

Embodiments of the present invention are related to determining when to update data on a device.

2. Background Art

Client devices typically periodically request updates from the server. In response to the request, the server transmits an update to the client device. For example, a user may use the client device to access a service, e.g., an e-mail account of the user. The client device requests updates pertaining to the service provided by the server, e.g., to determine if any additional e-mails have been received.

In some situations the refresh frequency will be too high, so that the client device is refreshed even when the user is not using the device. Because these updates occur when the user is not actively using the service, they often result in null updates (i.e., a transmission from the server indicating no update is to be made), and thus can be an excess load on the server.

In other situations the rate or frequency may be too slow, so that the user using the client device may be shown stale or out-of-date information. For example, the client device may show that no e-mails have been received when actually the server has received new e-mails. Thus, the client server systems that periodically pull data from a server may suffer from excess load on the server or stale data. In other systems, the rate at which the client device generates refresh requests changes is based on the length of time that the client device has accessed a particular service. For example, the rate at which an e-mail inbox is refreshed can decrease as the length of time for which the user has access to e-mail inbox increases. Even in, these systems, however, the refresh frequency is not linked to actual user activity, and therefore can result in either excess load at the server because of null updates or stale data at the client device because of a too slow refresh rate.

What is needed, then, are methods and systems that allow for client devices to be updated at a higher refresh frequency when the user is using the device and be updated at a lower refresh frequency when the user is not using the device.

BRIEF SUMMARY

Embodiments of the present invention relate to determining when to generate a refresh request based on user activity. In one embodiment, a method of synchronizing data is provided. The method includes receiving, at a server, information identifying a detected user interaction with a device, determining, at the server, a probability that a user will access a service provided by the server using the device at a time, and generating, at the server, a session signature based on the determined probability, wherein the session signature is used by the device to generate refresh requests associated with the service.

In another embodiment, a method of synchronizing data on a device is provided. The method includes detecting, at the device, a user interaction with the device, generating, at the device, a session signature based on the user interaction, and pulling data from a server based on the determined session signature.

In still another embodiment, a server includes a storage configured to store information identifying a detected user interaction with a device, and a pattern extractor configured to determine a probability that a user will access a service provided by the server using the device at the time and to generate a session signature based on the determined probability. The session signature is used by the device to generate refresh requests associated with the service.

In another embodiment, a system for facilitating synchronization of data on a device includes a storage configured to store information regarding a user interaction with the device, and a refresh request module configured to determine a refresh frequency based on the detected click and to pull data from a server based on the determined refresh frequency.

Further embodiments, features; and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIGS. 21a-c show diagrams of session behavior, according to embodiments of the present invention.

FIGS. 22a-d show query histograms, according to embodiments of the present invention.

Figure 23A:
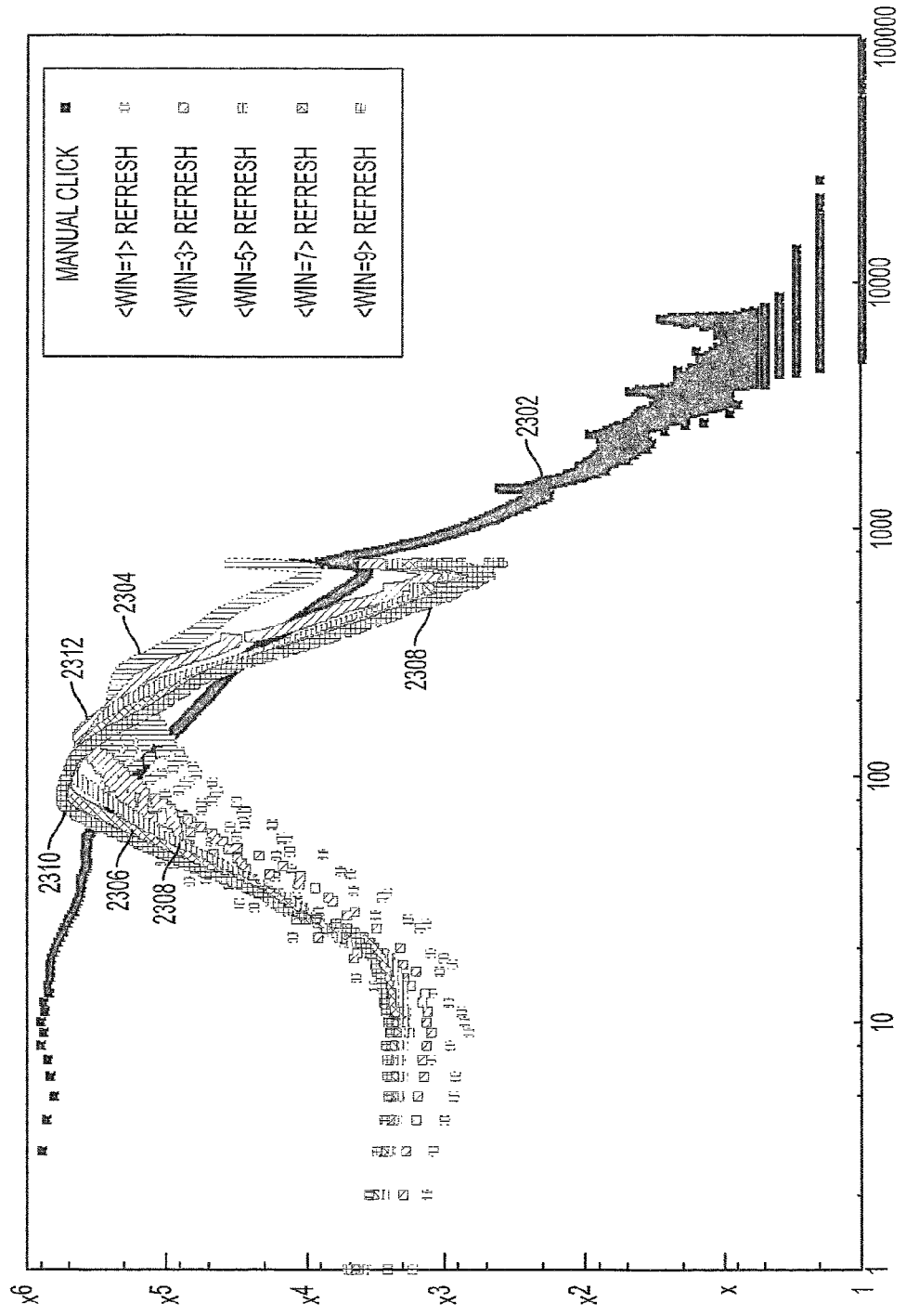
Figure 23B:
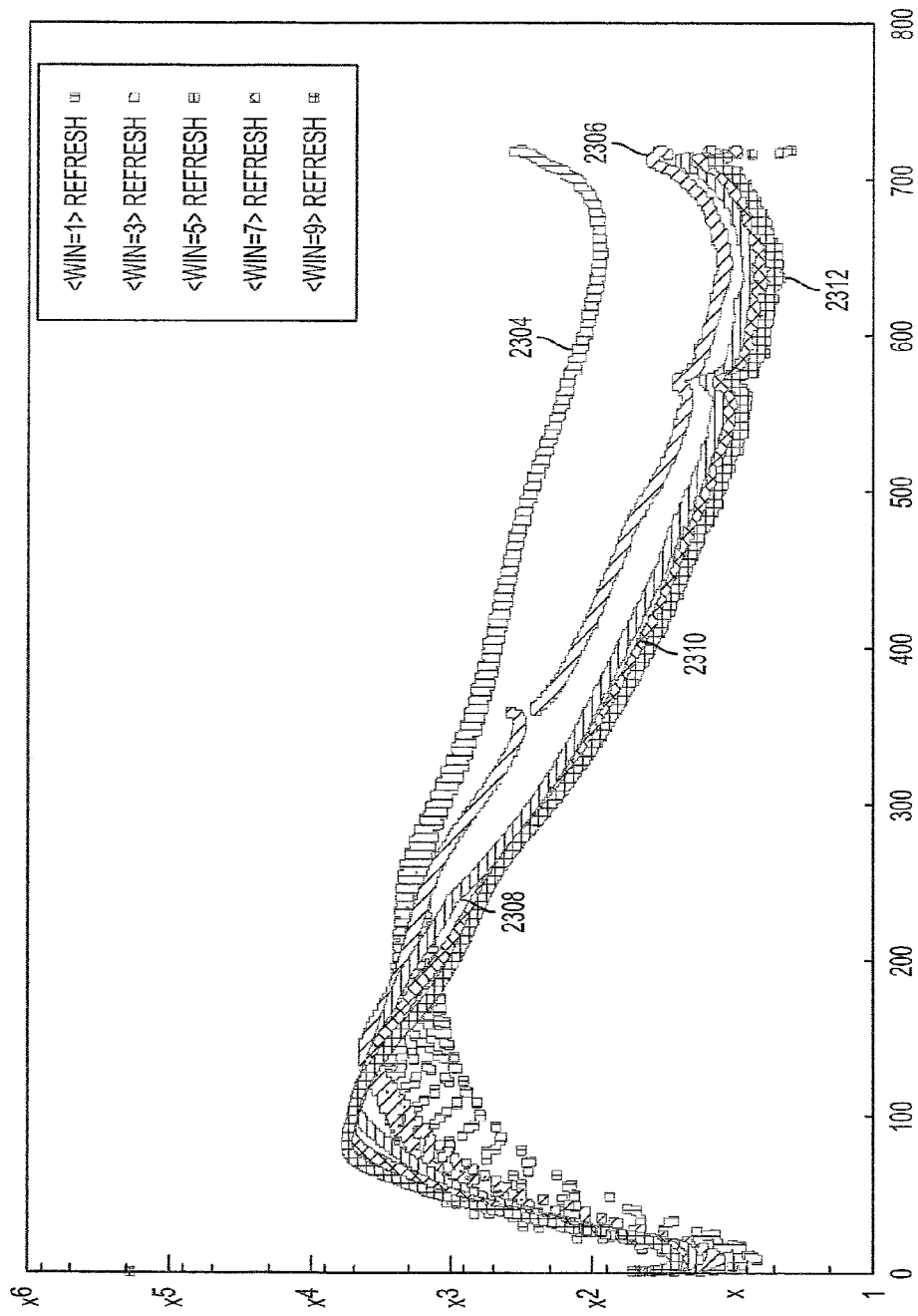
Figure 23C:
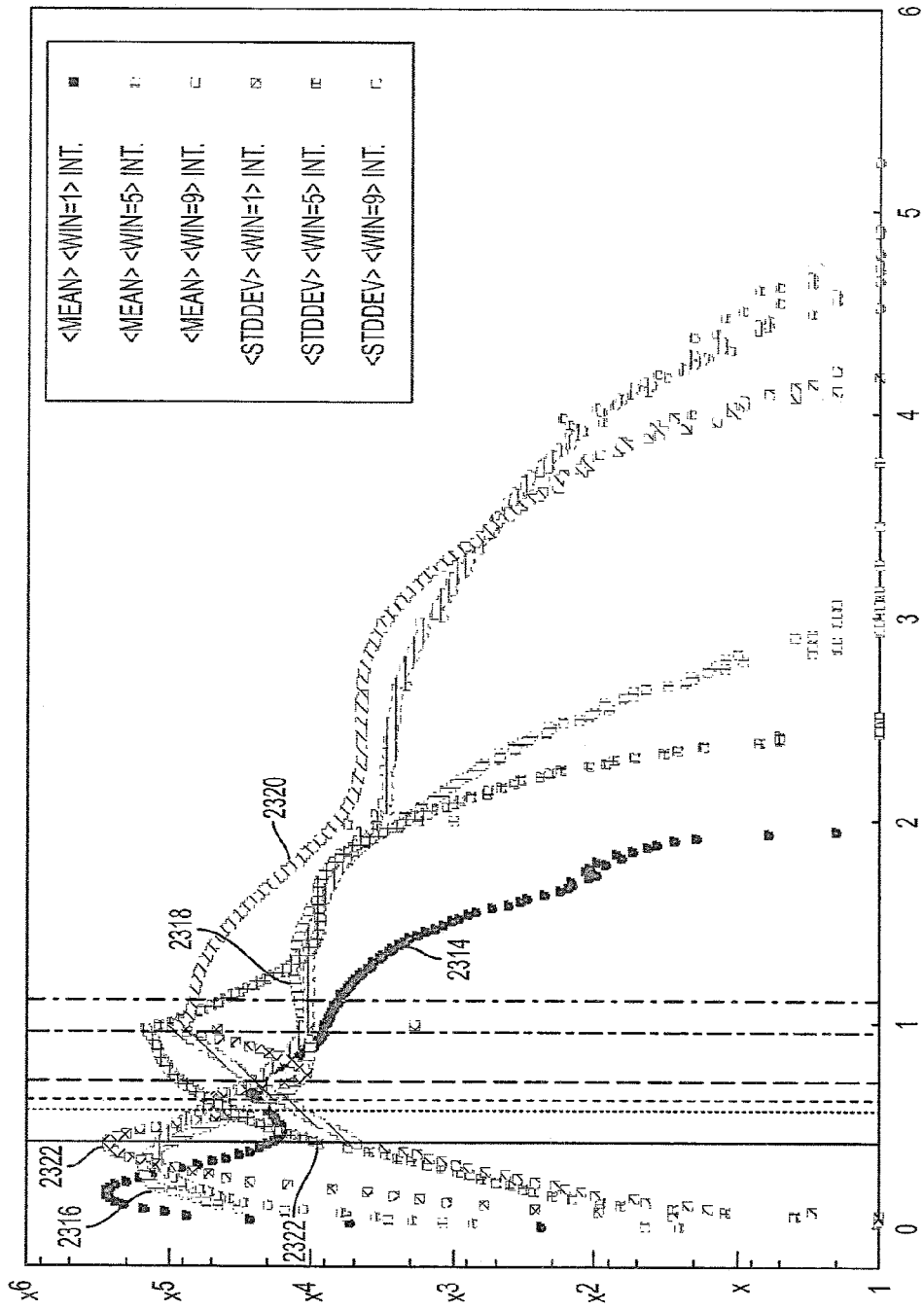

FIGS. 23a-c shows query histogram for all email service users for different size window smoothing, according to embodiments of the present invention.

FIG. 24 shows a tightening window spread factor, according to an embodiment of the present invention.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Introduction

The World Wide Web has seen tremendous growth since its early days at CERN, and in the past few years has witnessed a steady shift away from the traditional desktop computing paradigm. The rapid emergence of cloud computing as a means of service deployment has given rise to three main functional entities—service providers who build and manage universally accessible, massively scalable and highly reliable computer infrastructure as an utility/commodity, software vendors who host their applications in this cloud avoiding capital expenditure and instead paying only for their resource utilization, and end users who can now access technology-enabled applications easily without knowledge of the underlying infrastructure.

While many providers benefit from multi-tenancy and economies of scale, the many software vendors benefit from on-demand access to resources for their Software as a Service (SaaS) deployments worldwide. The greatest beneficiaries in this ecosystem, though, have been the end users. The use of open standards, technological convergence, and pervasive computing has enabled users to access/process information through a multitude of devices. Instant email and messaging through desktop clients, web browsers, mobile phones, interactive TV etc. is now possible. Users can thus access their data in the cloud using any device, at any time, anywhere in the world, and in any desired form, with little or no restrictions.

The widespread, adoption of these ubiquitous applications is now primarily governed by natural expectations of a coherent user experience, transparently supporting user and data migration across multiple devices. Device synchronization within the cloud to avoid a stale application state can be improved if it is seamless, instantaneous, and unbeknownst to the user. In applications where data reconciliation can be both quick and easy, on-access device sync would suffice. However, this can be untenable for applications requiring longer synchronization cycles or needing a moderately complex update mechanism because of possibly undesirable user-perceived delays and slow application response times. Also, the synchronization delay not only depends on the nature of the application, but also on the time since last update and the resulting size of the changelog.

In a pull model, the different clients (devices) fetch data from the server (cloud) at some pre-defined intervals. While a lower pull frequency leads to delayed data coherence, a higher pull frequency leads to increased resource consumption. Although achieving an optimal threshold can be difficult, many web applications today use periodic polling for updates as it is both light-weight and easily deployed. Hybrid push-pull mechanisms exploiting persistent (keep-alive) HTTP connections and reverse-AJAX style asynchronous polling such as COMET and the Bayeux protocol have also been proposed. In parallel, toolkits such as Google Gears, Microsoft Sync Framework, and others provide the ability to use applications off-line, yet seamlessly synchronizing with the cloud whenever possible.

In existing pull client/server systems, client devices periodically request updates from the server. Upon receiving a request from a client device, the server transmits an update to the client device. For example, a user may use the client device to access a service, e.g., an e-mail account of the user. The client device requests updates pertaining to the service provided by the server, e.g., to determine if any additional e-mails have been received.

The client device will often generate refresh requests at a predetermined frequency. Sometimes this frequency will, be too high when the user is not actively accessing the service. This can result in null updates (i.e., a transmission from the server indicating no update is to be made) being transmitted to the device. Null updates simply inform the client device that no updates to the service being provided by the server have been made. For example, a null update may show that no additional e-mails have been received. Because these null updates do not result in any updated information being transmitted to the client device, they can be an excess load on the server.

In other situations the rate or frequency may be too slow, so that the user using the client device may be shown stale or out-of-date information. For example, the client device may show that no e-mails have been received when actually the server has received new e-mails. Thus, the client server systems that periodically pull data from a server may suffer from excess load on the server when the refresh frequency is too high or stale data when the refresh frequency is too low. In other systems, the rate at which the client device generates refresh requests changes based on the length of time since the client device first initiated a session with a service. For example, the rate at which an e-mail inbox is refreshed can decrease as the length of time since the user first used a device to access his e-mail inbox. For example, the server can interpret the increased access time as showing that the user using the client device has moved onto other tasks and is no longer actually using the service. Even in these systems, however, the refresh frequency is not linked to actual user activity, and therefore can result in either excess load at the server because of null updates or stale data at the client device because of a too slow refresh rate.

Terminology

As described herein, an HTTP request is represented by three pieces of information: a user id, a location id, and a cookie id that are typically used to identify a specific user, location of user using a device, or a specific device, respectively. However, these pieces of information do not always produce an accurate identification.

Usually, a user id maps a digital identity to a user. A user id can, however, map to a group of people when a group of users shares a single account. A location_id typically is used to identify a network address of a device that issued a request. However, the use of network address translation, proxy servers, etc., often means that the location_id may not correctly identify the network address of the issuing device. A cookie_id, i.e., a browser cookie, does not always accurately identify a device because of, e.g., browser state synchronization across devices by various applications, and pro-active, user deletion of cookies due to privacy or anonymity concerns. However, the above-mentioned inaccuracies are relatively few, and thus the terms cookie, location, and device and use are unified and used interchangeably herein. In one example, tuples that include a user id and a cookie id are used to represent user migration patterns on the Internet.

Exemplary Embodiments

In embodiments described herein, systems and methods are provided in which the refresh frequency is determined based on user activity. User interactions are used to determine whether the user is using the device to actively access a service provided by a server. When user interactions indicate that the user is using the device, the refresh frequency is increased so that stale data is not presented to the user. For example, a pattern of past user interactions can be used to determine the likelihood a user will use the device at a future time. Conversely, when a lack of user interactions indicates that a user is not using the device, the refresh frequency is decreased to decrease the excess load on the server.

In, other words, embodiments of the present invention provide a smart sync approach that exploits user behavior (past access patterns) to determine the likelihood of an impending user access to trigger a pro-active update. This not only consumes far fewer resources due to throttling of updates during periods of expected user inactivity, but also provides maximal data coherence across devices due to pro-active data synchronization.

More specifically, systems and methods described herein generate a session signature. The session signature is a function that maps a given time to a corresponding refresh frequency (or a value indicative of a refresh frequency). For example, the session signature may map the time of a day, e.g., a time during a particular day of the week, to a corresponding refresh frequency. The client device, then, determines a current time and maps that to a refresh frequency. The time elapsed since the last refresh is then determined and compared to a period defined by the refresh frequency, i.e., the inverse of the refresh frequency. If the elapsed time is greater than, or equal the period defined by the refresh frequency, the client device generates a refresh request.

In an embodiment, user interactions with the client device are detected and refresh requests are generated based on those detected user interactions. In another embodiment, past user interactions are used to predict when a user will be using the client device.

Figure 1:
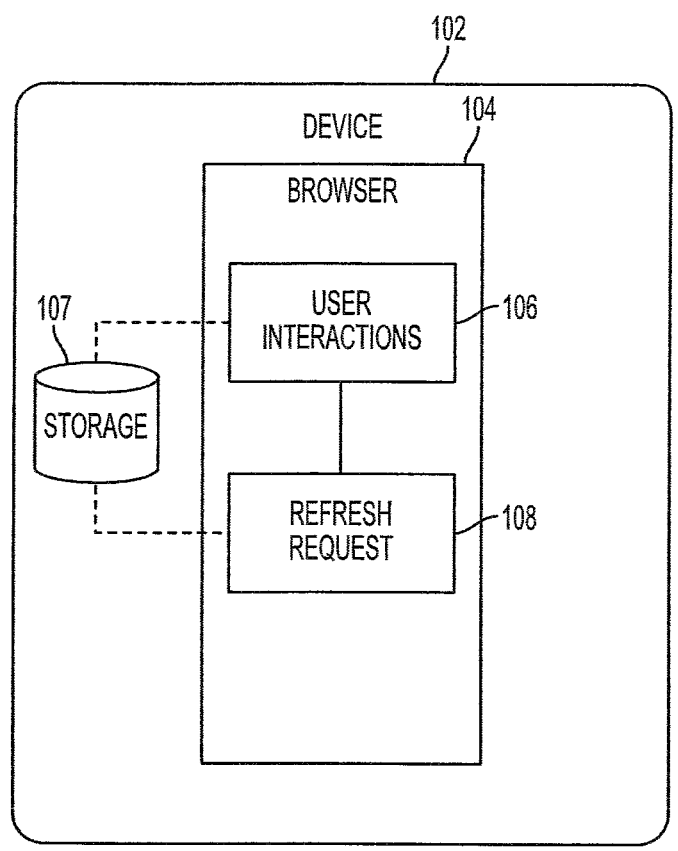
FIG. 1 shows a block diagram of client device, according to an embodiment of the present invention.

FIG. 1 shows a client device 102, according to an embodiment of the present invention. In an embodiment, device 102 can be a personal computer, a laptop, a-cellular phone, or other data processing device. Client device 102 has a browser 104 running on it. For example, browser 104 may be used to access a service, e.g., an e-mail account, provided by a server (not shown in FIG. 1). Browser 104 includes a user interactions module 106 and a refresh request module 108. Device 102 further includes a storage 107. The operation of device 102 will be described further with respect to flowchart 200.

Figure 2:
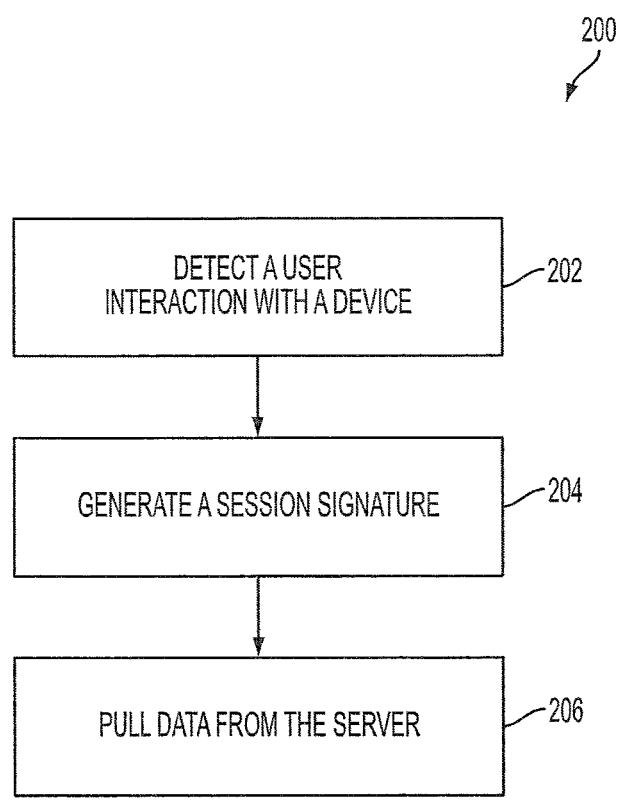
FIG. 2 shows a flowchart illustrating a method for synchronizing data on a device, according to an embodiment of the present invention.

As shown in FIG. 2, an exemplary method 200 for synchronizing data on a device is provided, according to an embodiment of the present invention. As would be apparent to those skilled in the relevant art(s), such a method may be automated through the use of hardware, software, firmware, or any combination thereof. Method 200 will be described with reference to the embodiment of FIG. 1, but is not limited in that regard.

In step 202, a user interaction with the device is detected. For example, in FIG. 1, user interactions module 106 may detect a user interaction with client device 102. In an embodiment, the user interaction is a click with a mouse that is coupled to client device 102. As would be understood by those skilled in the relevant arts based on the description herein, user interactions module 106 can be configured to detect other types of user interactions with client device 102. As shown in FIG. 1, user interactions module 106 is coupled to storage 107. In an embodiment, user interactions module 106 stores information identifying the detected user interactions in storage 107. In an embodiment, the identifying information specifies the type of user interaction and time and date information identifying when the user interaction occurred.

In step 204, a session signature is generated based on the detected user interaction. A session signature maps a time, e.g., time of a specific day, to a corresponding refresh frequency. Refresh request module 108 can generate the session signature according to a uniform refresh model. In a uniform refresh model, the session signature remains constant at a predetermined value for all time after the detected user interaction. This predetermined value can be stored in storage 107.

In another embodiment, refresh request module 108 can generate the session signature according a throttle refresh model. In a throttle refresh model, the value of the session signature decreases as the time elapsed from the user detected interaction increases. Thus, as time goes on the value of the session signature decreases, i.e., the time between refresh requests increases. Thus, to generate a session signature according to the throttle refresh model, refresh request module 108 can determine the elapsed time since the user interaction was detected for multiple times to generate a function that maps a time to refresh frequency.

Figure 3:
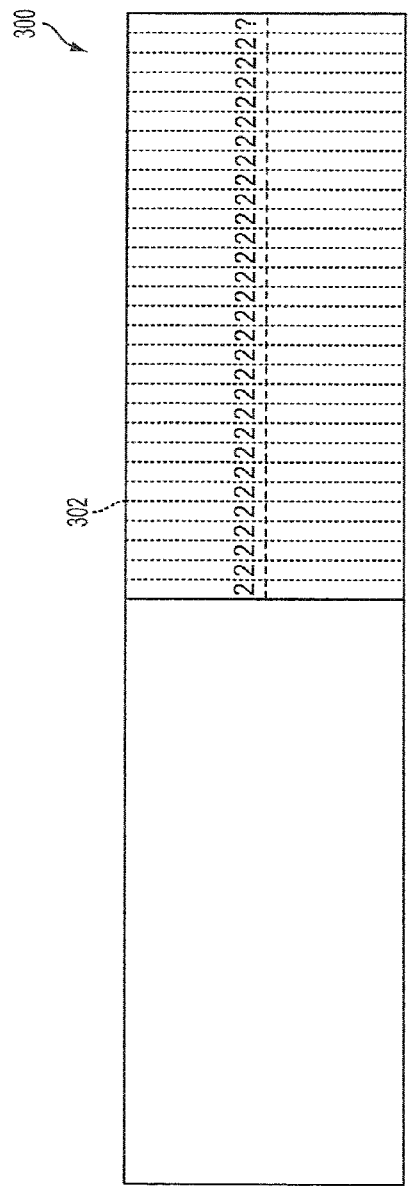
FIGS. 3 and 4 show diagrams representing the operation of uniform and throttle refresh models, respectively, according to embodiments of the present invention.
Figure 4:
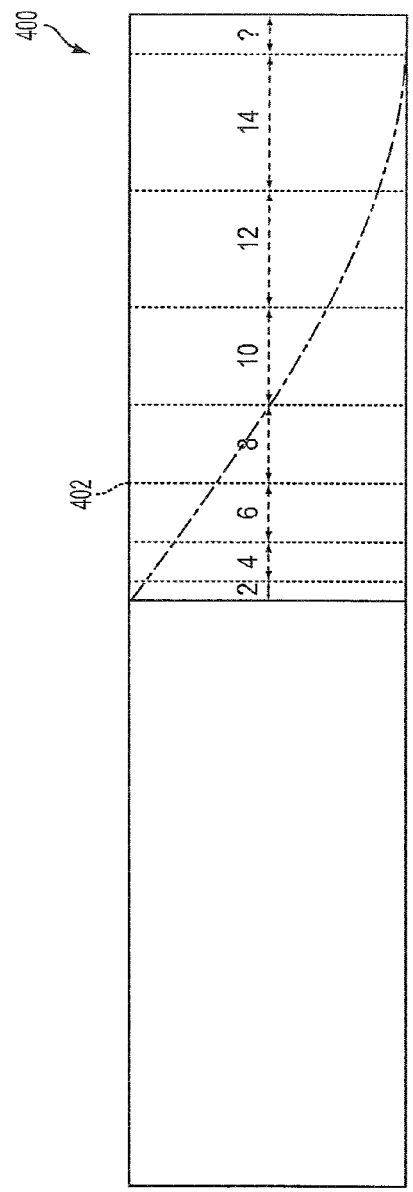

FIGS. 3 and 4 show diagrams 300 and 400, respectively representing the operation of uniform and throttle refresh models, according to embodiments of the present invention. Diagram 300 includes lines 302, representing times at which refresh requests are generated. The values between adjacent lines 302 in diagram 300 represent time that has elapsed between those requests. As shown in FIG. 3, each of the requests are separated from adjacent requests by a uniform time (shown in FIG. 3 as being two units of time). As shown in FIG. 4, the distance between adjacent lines 402 increases as time goes on. Thus, the time between generated refresh requests increases as time increases in the throttle refresh model. In an embodiment, the throttle refresh model provides a way of accounting for the decaying probability that the user is using device 102 at a particular time. In other words, the throttle refresh model reflects the observation that the probability that a user is actively using the device to access the service provided by the server is higher around the time the user interaction is detected and decays as time passes. The probability that a user is using the device at each time is then mapped to a corresponding refresh frequency. The refresh frequency is higher when the probability of the user using the device is relatively high and lower when the probability of the user using the device is relatively low.

In step 206, information is pulled from the server. For example, in FIG. 1, refresh request module 108 can generate a refresh request to be transmitted to the server. In a further embodiment, refresh request module 108 generates refresh requests based on the generated session signature. For example, refresh request module 108 can determine the time that has elapsed since the last refresh request was transmitted. Refresh request module 108 then maps the current time to a refresh frequency using the generated session signature. The elapsed time is then compared to a period defined by the refresh frequency (i.e., the inverse of the refresh frequency). If the elapsed time is greater than or equal to the determined period between refresh requests, refresh requests module 108 can generate a refresh request. In response to the refresh request, the server transmits an update to device 102. For example, the server may transmit an update to the status of the e-mail inbox of the user using device 102.

Thus, method 200 provides a method that can be viewed as using a single user interaction (e.g., single user click) to indicate user presence. FIGS. 21*a-c* show diagrams of different session behaviors, with individual lines indicating a user interaction (e.g., a user click). FIGS. 21*a*, 21*b*, and 21*c* represent light, medium, and heavy users, respectively. In one example, most users tend to exhibit behavior similar to the diagram shown in FIG. 21*c*. In an embodiment, method 200 may be more adept at characterizing user activity as the number of user interactions in a day increases.

In the above described embodiments, individual detected user interactions are used to generate a session signature. In another embodiment, a set of a user's past interactions with the device are used to predict whether the user is using a device at a given time. This probability is then used to generate the session signature.

Often, users display fairly stereotypical intra-day access patterns in addition to regular everyday usage, making them fairly repetitive and their access patterns relatively easy to predict. A variety of criteria may be used to determine whether the system will likely be able to accurately predict user interactions with a device. For example, user persistence, device spread, and time persistence may be used to determine whether the system can accurately predict user interactions for a given user using a device.

Figure 18:
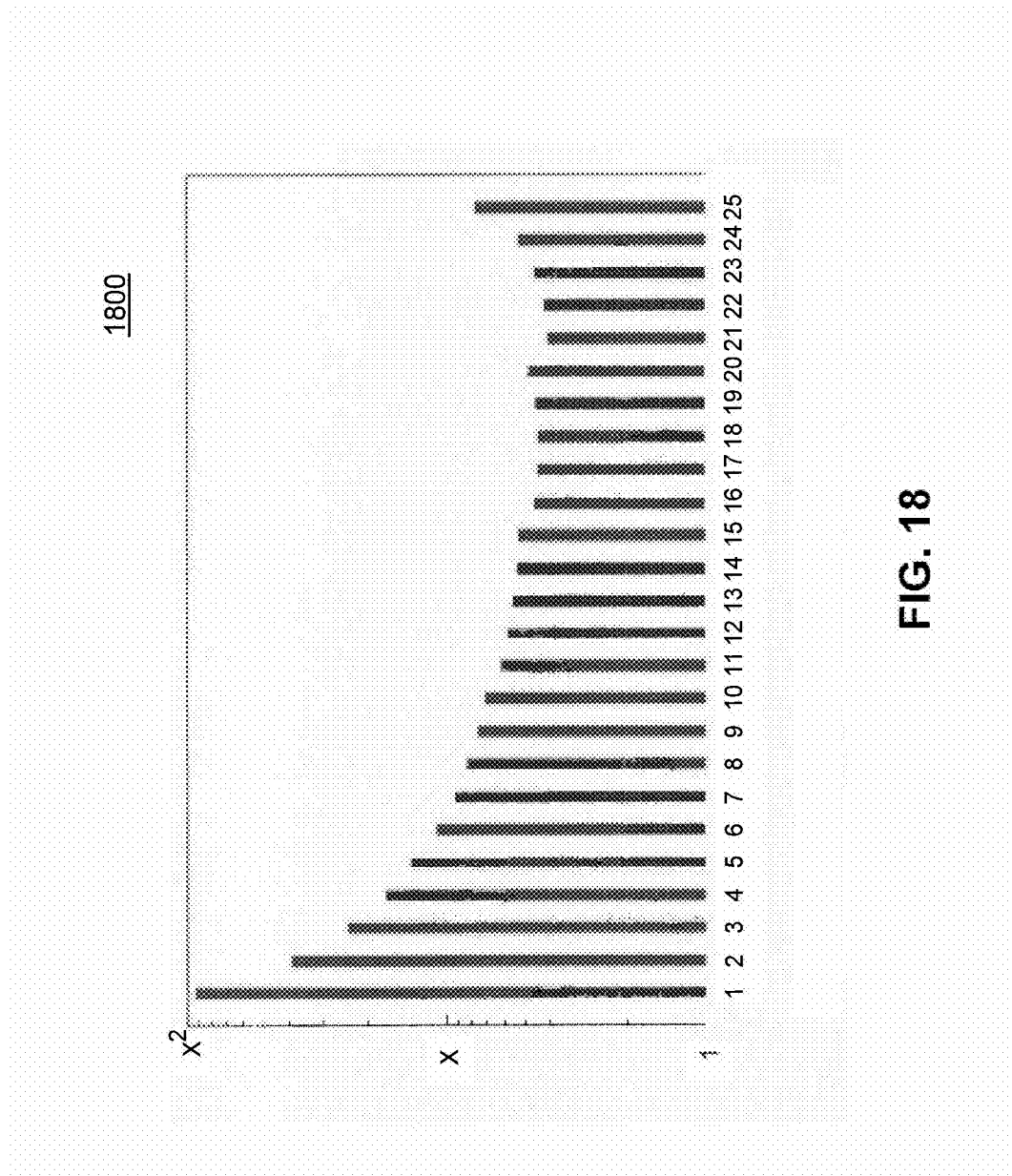
FIG. 18 shows a user persistence histogram, according to an embodiment of the present invention.

User persistence measures the amount of data available for a given user. For example, user persistence may measure the amount of data stored in the system relating to past user interactions with the device. User persistence is important because to make an accurate prediction, the system must have sufficient information regarding the user's past interactions to extract a pattern for the user. FIG. 18 shows a user persistence histogram 1800 for a 25-day observation window. The x-axis represents the total duration (in days) user accessed an email service web interface (e.g., the GMAIL service provided by Google, Inc. of Mountain View, Calif.), while the (log-scale) y-axis tracks the total number of users in each of those intervals. As shown in FIG. 18, there are a large number of highly persistent (heavy) users (long-tail). In an embodiment, patterning systems may be especially adept at generating accurate patterns for these heavy users.

Figure 19:
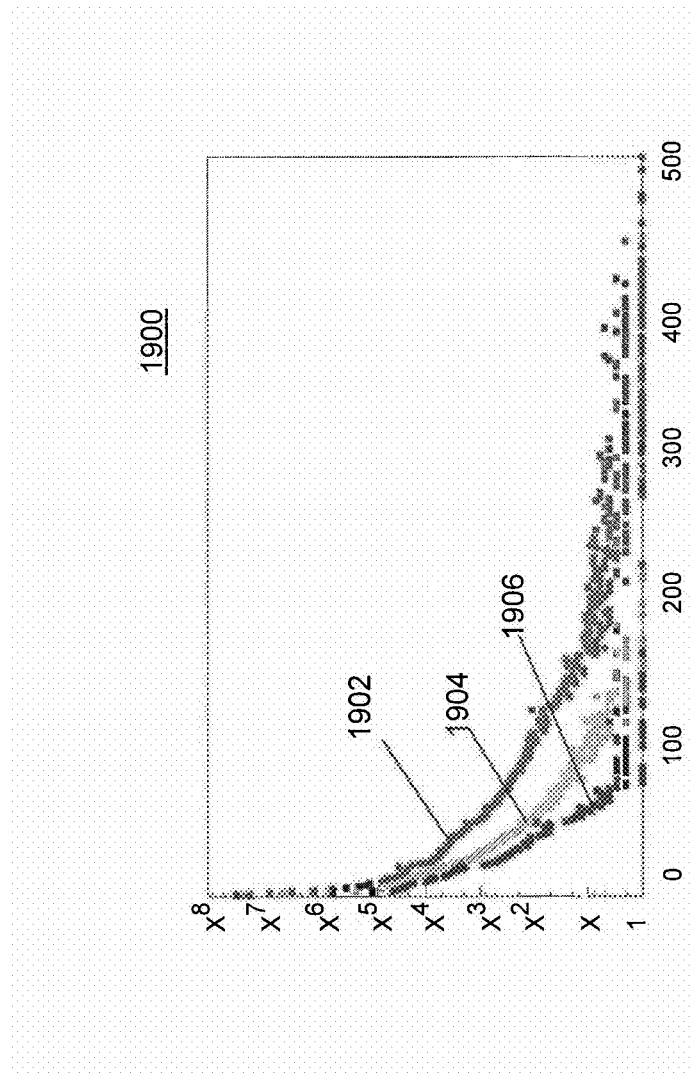
FIG. 19 shows a device spread histogram illustrating the number of cookies accessed by the user during an observation window, according to an embodiment of the present invention.

Device spread measures the number of different devices a user will use to access the service. For example, device spread may measure the number of different devices a user may use to access an e-mail account. As, the number of devices increase, it may become more and more difficult to make an accurate prediction. FIG. 19 shows a histogram 1900 including plots 1902, 1904, and 1906, illustrating the maximum, average, and minimum, respectively, number of cookies accessed by a user during the 25-day observation window. The x-axis represents the total number of distinct cookies, while the (log-scale) y-axis tracks the number of users accessing the corresponding number of cookies. As shown in FIG. 19, a large number of users interact with multiple cookies or multiple devices on a regular basis. The seemingly large number of cookies for certain users can be attributable to users sharing an account or an incorrect query to device attribution.

Figure 20:
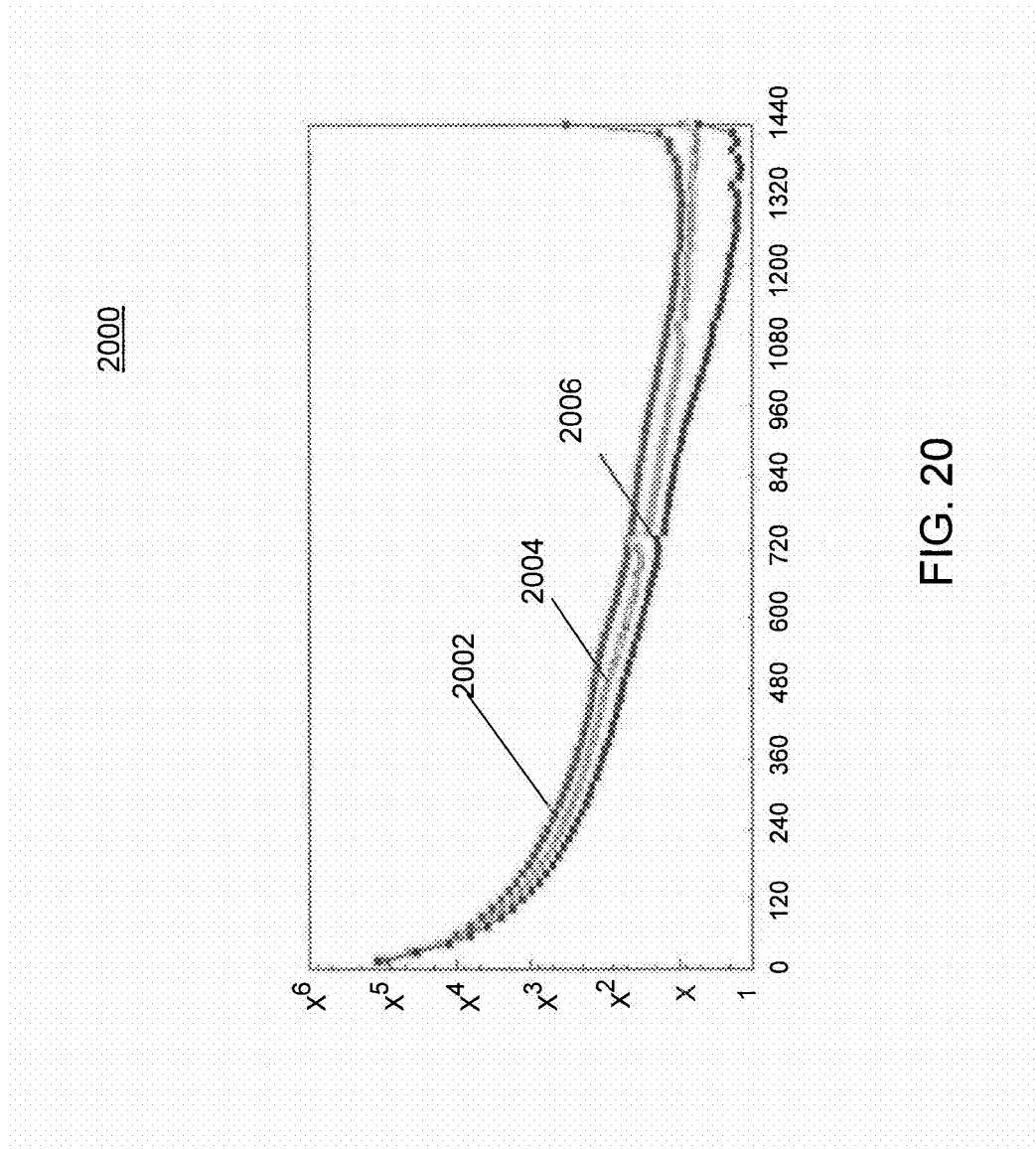
FIG. 20 shows the time persistence histogram tracking the number of users in intervals, according to an embodiment of the present invention.

Time persistence measures the cumulative time duration that each user accesses a particular service. For example, time persistence may measure how long a user accesses an e-mail account each time he or she logs on to the account in a given period of time, e.g., how many hours a day the user access an email account. The ability of the system to accurately predict user interactions is inversely proportional to the time persistence of a user. FIG. 20 shows the time persistence histogram 2000 where the x-axis represents the time persistence intervals (in minutes/day), while the (log-scale) y-axis tracks the number of users in each of those intervals. Plots 2002, 2004, and 2006 illustrate the maximum, average, and minimum, respectively, number of users in each of those intervals. As shown in FIG. 20, a majority of users show activity for less than a few hours a day. An always-on periodic polling sync strategy may perform poorly for those users. User accounts having high time persistence can be attributed to coarse-grained time data available and mismatched query to user attribution, both induced by the content stripping process for anonymization of access logs.

Figure 5:
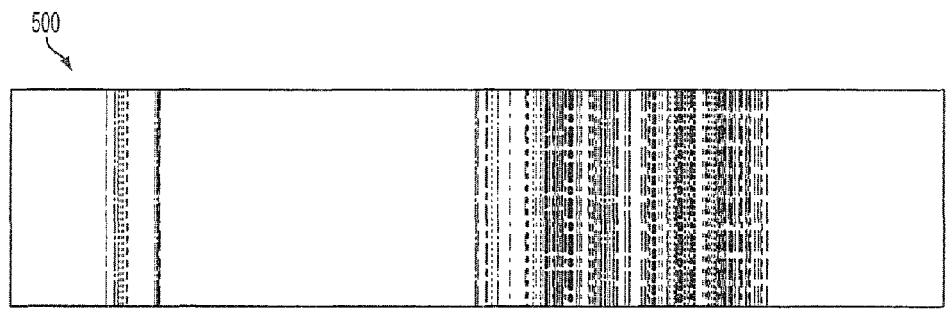
FIGS. 5-7 show diagrams illustrating user activity.
Figure 6:
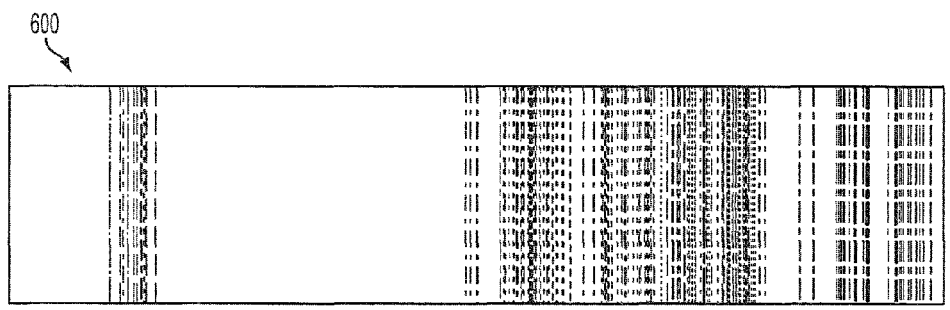
Figure 7:
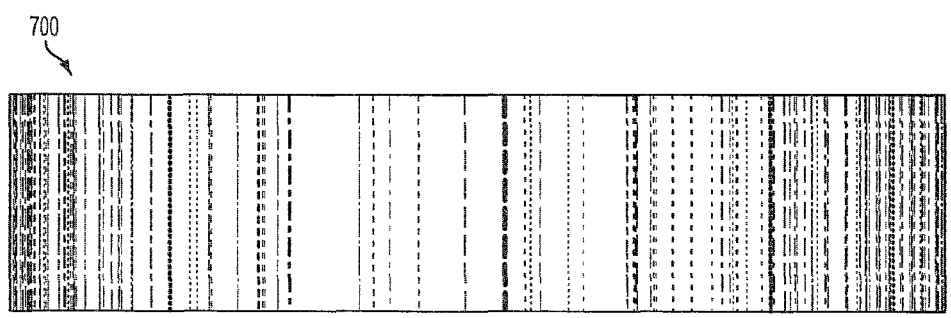

A predictive system may also be more effective when the user's activity is correlated to a time interval. For example, a predictive system may work better when a user's activity can be correlated to a certain time of day or certain days of the week. For example, FIGS. 5, 6, and 7 show diagrams 500, 600, and 700, respectively. Each of diagrams 500-700 show lines indicating a user's activity on a certain day. Diagram 500 shows a user's activity which is highly correlated to certain days. On the other hand, diagram 700 shows the activity of a user that has almost no correlation to certain days of the week. Diagram 600 shows the activity of a user showing moderate correlation to certain days of the week. The higher the correlation to a certain time interval, the more reliable the system will be in predicting user interactions.

In a predictive system, session signature(s) are used to generate refresh requests at the client device. Multiple session, signatures may be used for high-activity users. High-activity users also may have larger session signatures.

In one embodiment, fixed-sized session signatures that track the probability of a user click across multiple contiguous and disjointed time intervals are used. The session signature size in this embodiment is determined by the granularity of the individual time intervals and the precision of the click probabilities in each time interval.

In another embodiment, an exponentially weighted moving average technique is used to succinctly capture user access patterns across multiple days. Equation 1 represents the session signature (Sn) as the union of multiple user click probabilities (Ptn) for the different time instances—where α is the weight assigned to any new entry pt with respect to the previously measured user click probability (Ptn−1) in that time interval (t) but in the older session signature (Sn−1).

$$S_i = \bigcup_{\forall t} P_i^t = \bigcup_{\forall t} (\alpha * p^t + (1 - \alpha) * P_{i-1}^t) \quad (1)$$

Exemplary adaptive sync models that each display a different update interval adaptation around any single user click are provided in different embodiments herein. As would be understood by those skilled in the relevant art(s) based on the description herein, other adaptive sync models can be used without departing from scope and spirit of the embodiments described herein. The models below are described in terms of the embodiment in which detected user interactions are user clicks. Those skilled in the relevant art(s) will recognize that the models provided below can also be applied to other user interactions.

Each of the three exemplary per-click models described below can be can be combined across multiple user clicks both intraday and inter-day, thereby, achieving better resource utilization.

Uniform Refresh: This exemplary per-click model assumes a uniform access probability distribution around any user click; and essentially represents the basic periodic polling technique. Equation 2 depicts the individual time instances of subsequent updates, where $U_0$ represents the registered user click, and 0 is a constant (e.g., 2 time units).

$$U_n = U_{n-1} + \Delta = U_0 + n*\Delta, \; \forall n > 0 \tag{2}$$

Throttle Refresh: This exemplary per-click model assumes a monotonically decreasing access probability distribution around any user click, and thus the refresh interval steadily increases. One experimental evaluation of refresh interval adaptation indicates that user access trends more closely to an arithmetic growth models than a geometric or exponential growth model. Equation 3 depicts their individual time instances following an additive growth model.

$$U_n = U_{n-1} + n*\Delta = U_0 + n*(n+1)/2*\Delta, \; \forall n > 0 \tag{3}$$

Predict Refresh: This exemplary per-click model accounts for refresh interval adaptation not only leading away from the user click, but also leading towards that user click. Thus it supports pro-active updates for better data coherence, and represents an axial reflection of throttle refresh about the user click. Equation 4 represents the (additive) modulation of the corresponding refresh time instances around the user click.

$$U_n = \begin{cases} U_{n+1} + n*\Delta = U_0 - \dfrac{n*(n-1)}{2}*\Delta & \text{if } n < 0 \\ U_{n-1} + n*\Delta = U_0 + \dfrac{n*(n+1)}{2}*\Delta & \text{if } n > 0 \end{cases} \tag{4}$$

The global sync schedule for any session can be viewed as the interference pattern of the individual sync schedules at each user click that are smoothed across multiple days using an exponentially weighted moving average technique. A minimum inter-update spacing to avoid overlapping updates may be maintained by preemptive suppression of closely-spaced refresh queries. In an embodiment, these precise adaptive sync models are more accurate for users having a high click-behavior correlation across multiple days.

Somewhat imprecise yet more practical models based on aggregate click probability tracking across multiple contiguous and disjointed time intervals are also provided (e.g., the slotted refresh model described below). In some situations, predicting the exact time instant of any user click is difficult. Such a predicted exact time can depend on myriad factors including the number of emails received at the email account of the user, the relative priorities of the received emails, average user response times, etc. In these situations, it can be more efficient to determine the user click probabilities over longer time intervals. A longer time interval can result in more precise click predictions. However, these longer time intervals may not have better data coherence (by update prefetching) due to the large size of the intervals. Thus, embodiments herein provide appropriately-sized time intervals that provide good click predictions (thus better data coherence), while also limiting session signature, storage overhead.

Slotted Refresh: This exemplary model is similar to the predict refresh model described above, but assumes a discrete probability distribution across the many time interval boundaries. This results in a non-continuous (step-like) growth in refresh intervals, increasing as time interval boundaries away from a user click are traversed.

Another embodiment to be considered is the window/probability spread factor that accounts for the expected idle time between user clicks. User activity often spans multiple neighboring time intervals where not all of them register a user click everyday. These sandwiched zero-activity time intervals represent idle user behavior. Probability smoothing functions that each smooth access probabilities across multiple neighboring time intervals can be used to accurately model these passively active idle time intervals.

The global sync schedule can again be viewed as the interference pattern of the individual sync schedules where the click probability in any time interval is the sum of the individual (scaled) click probabilities as determined by the window spread factor of its neighboring user click regions. As described above, an exponentially weighted moving average technique can be used to smooth the effect of variations in user click behavior across multiple days.

Thus, session signatures can be modeled as a collection of contiguous yet disjointed time intervals, where each element represents the user access probability (and hence the associated sync lag) for that time interval. Idle user behavior can be detected and a smoothing function can be used to provide better data coherence, and thus higher user satisfaction.

Figure 8:
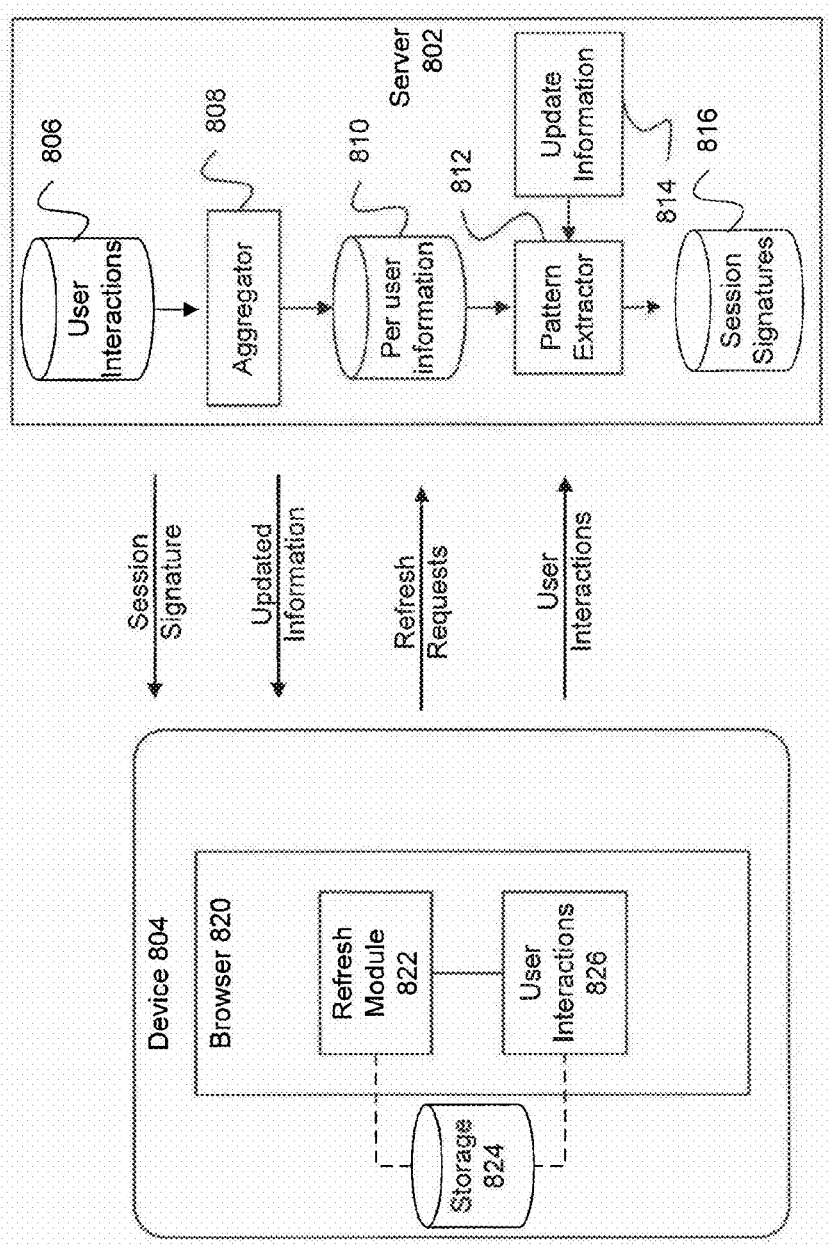
FIG. 8 shows a system for providing updated information to a client device based on predicted user activity, according to an embodiment of the present invention.

FIG. 8 shows a system 800 for providing updated information to a client device based on predicted user activity, according to an embodiment of the present invention. System 800 includes a server 802 and a device 804. Server 802 includes storages 806, 810, and 816, an aggregator 808, a pattern extractor 812, and an update information module 814. Device 804 includes a storage 824 and has a browser 820 running on it. In an embodiment, storages 806, 810, and 816 are different parts of the same storage. In an alternate embodiment, each of storages 806, 810, and 816 are separate storages. The operation of systems 800 will be described with reference to flowchart 900.

Figure 9:
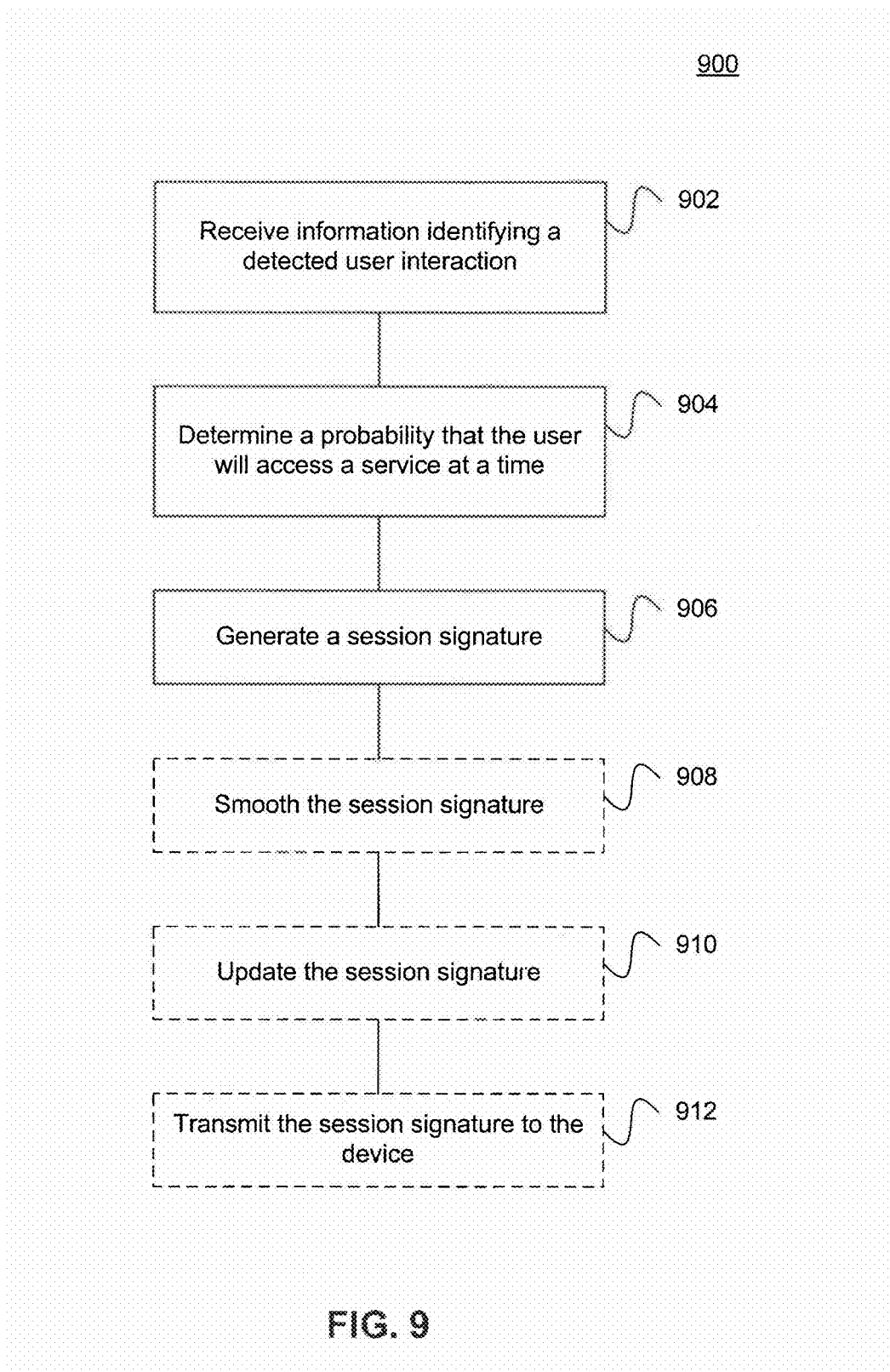
FIG. 9 shows a flowchart illustrating a method for synchronizing data, according to an embodiment of the present invention.

As shown in FIG. 9, an exemplary method 900 for synchronizing data is provided, according to an embodiment of the present invention. As would be apparent to those skilled in the relevant art(s), such a method may be automated through the use of hardware, software, firmware, or any combination, thereof. Method 900 will be described with reference to the embodiment of FIG. 8, but is not limited in that regard.

In step 902, information identifying a detected user, interaction is received. For example, in FIG. 8, user interaction module 826 detects a user interaction at device 804. In an embodiment, the user interaction is a click of a mouse coupled to device 804. User interaction module 826 can store information identifying the user interaction in storage 824, e.g., the time and date of the user interaction, type of user interaction, etc. Device 804 then sends the user interaction information to server 802. Upon receiving the user interaction information, server 802 may store that information in storage 806. In an embodiment, device 804 may store multiple blocks of information corresponding to different user interactions at storage 824. Once a predetermined number of user interactions have been stored or a predetermined time interval has passed, device 804 can then transmit all of the different user interaction information blocks to server 802 in a single transmission.

In another embodiment, information identifying user interaction(s) can be received from other servers. For example, server 802 may be used to provide a first service, e.g., email, and a second server (not shown in FIG. 8) can be used to provide another service, e.g., instant messaging, document access, etc. In such an embodiment, server 802 can interact with the second server to obtain the information (which device 804 had transmitted to the second server in the past).

In step 904, a probability that the user will access a service with the device at a given time is determined. For example, in FIG. 8, aggregator 808 access storage 806 and aggregates different information blocks corresponding to different user interactions on a per user basis. Aggregator 808 stores the result at storage 810. Pattern extractor 812 accesses the per user information stored in storage 810 to determine a probability that a user will access a service provided by server 802 at a given time. For example, pattern extractor 812 can determine the likelihood of whether a user using device 804 will access an e-mail account, provided by server 802 at a given time. In a further embodiment, pattern extractor 812 determines a probability that a user using device 804 will access the service at a series of different times. For example, pattern extractor 812 can repeat the probability determination for different tunes of a day and different days of a week.

In an embodiment, pattern extractor 812 analyzes the user's past interactions over a given period of time, e.g., a week, a month, etc., and determines a pattern characterizing the user's interactions. For example, pattern extractor 812 can determine that it is very likely that the user will use device 804 to actively access the service provided by server 802 at 9:00 am on weekdays, because there has been a relatively high density of clicks with a mouse at that time during weekdays over the last month.

In an embodiment, pattern extractor 812 determines a probability that a user will be using device 804 at particular time instances. In another embodiment, pattern extractor 812 determines a probability that a user will be using device 804 during a particular time slot. In an embodiment, it may be easier to determine a probability that the user will be using the device during a time slot rather than a particular time instance. As a length of the time slot increases, the more reliably pattern extractor 812 will be able to accurately predict whether a user is using device 804. However, as the time slots increase in size, the system loses granularity, and therefore can become ineffective. The size of a time slot can be determined by examining past user behavior and determining the relative importance of these two factors. For example, the length of a time slot may be determined by analyzing different block(s) of information corresponding to different user interaction(s) stored in storage 806 and weighing the benefits of long and short time slots listed above. In an example embodiment, a time slot can be three minutes.

In an embodiment, aggregator 808 aggregates user interactions stored in storage 806, not only on a per user basis but also on a per device basis. As will be appreciated by those skilled in the relevant arts based on the description herein, a user may use several different devices to access a service provided by server 802. For example, a user may use a desktop computer, a laptop computer, and a mobile data processing device such, as a mobile phone to access an e-mail account. Thus, by aggregating data in storage 806 first on a per user basis and then on a per device basis, not only can the probability that a user will access a service provided by server 802 be determined at a given time, but also a probability that a user will access the service provided by server 802 at a given time using a particular device can also be determined. In such an embodiment, the steps of flowchart 900 can be repeated for each different device that the user uses to access the service provided by server 802.

In step 906, a session signature is generated based on the determined probability. As described above, the session signature maps a time to a refresh frequency. For example, the session signature can be used to map a particular time instant to a corresponding refresh frequency. In another embodiment, the session signature can be used to map a particular time slot to a refresh frequency. Pattern extractor 812 determines the value of the session signature at particular time based on the probability that the user will use the device to access the service at that time. The higher the probability that the user will use device 804 to actively access the service at a given time, the higher the value of the session signature at that time. The generated session signature is stored in storage 816.

Figure 10:
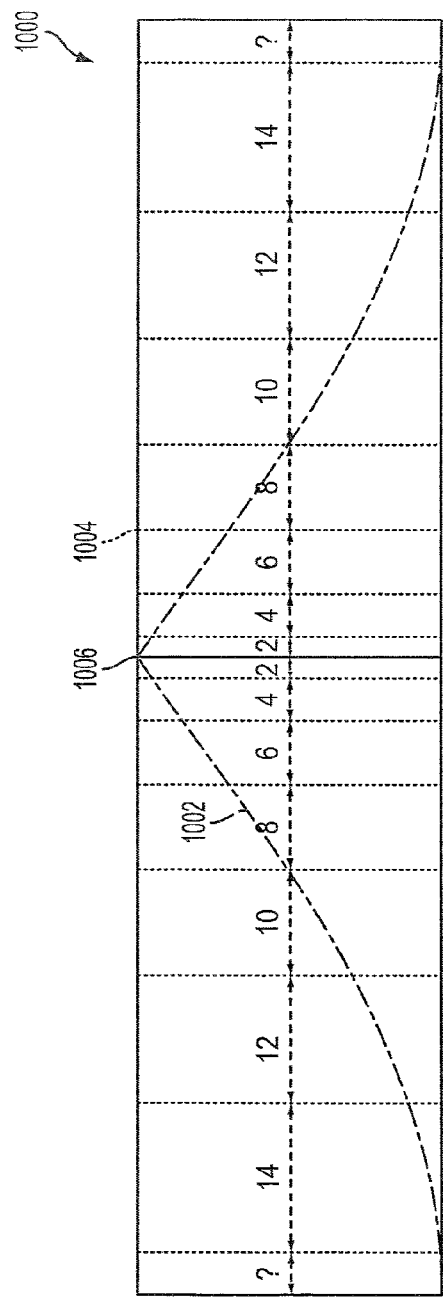
FIG. 10 shows a diagram of probabilities of user access and corresponding values of a session signature for different time instants, according to an embodiment of the present invention.

FIG. 10 shows a diagram 1000 of probabilities of user access and corresponding values of a session signature for different time instants, according to an embodiment of the present invention. Diagram 1000 includes a curve 1002 representing the probability that a user will actively access the service with device 804 as a function of time with time increasing from left to right. Lines 1004 indicate when device 804 generates a refresh request, and thus the times between adjacent lines 1004 are indicative of the value of the session signature at those times. As shown in FIG. 10, curve 1002 rises until a line 1006, where the probability of the user using the device to access the service is highest during the shown time period, and then falls after line 1006. As curve 1002 increases, the time between adjacent lines 1004 decreases, indicating an increase in the refresh frequency.

Figure 11:
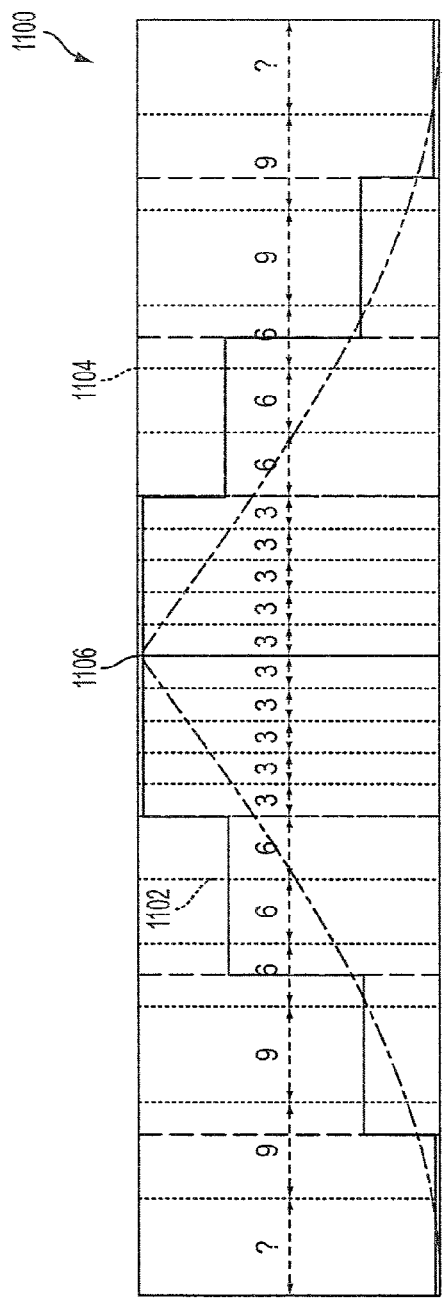
FIG. 11 shows a diagram of probabilities of user access and corresponding, values of a session signature for different time slots, according to an embodiment of the present invention.
Figure 12:
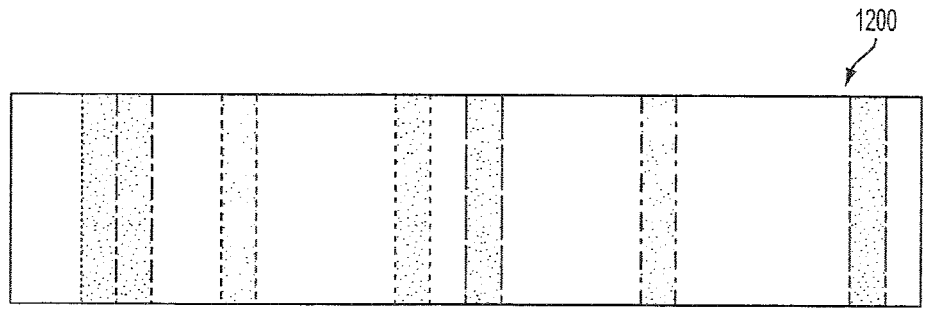
FIGS. 12-15 show diagrams representing session signatures having different levels of smoothing, according to embodiments of the present invention.
Figure 13:
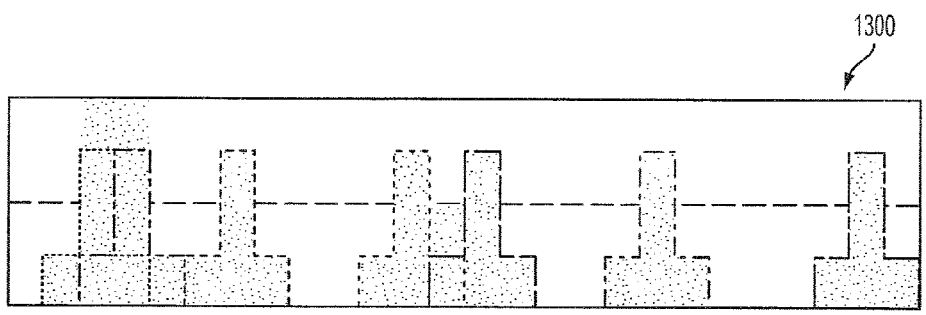
Figure 14:
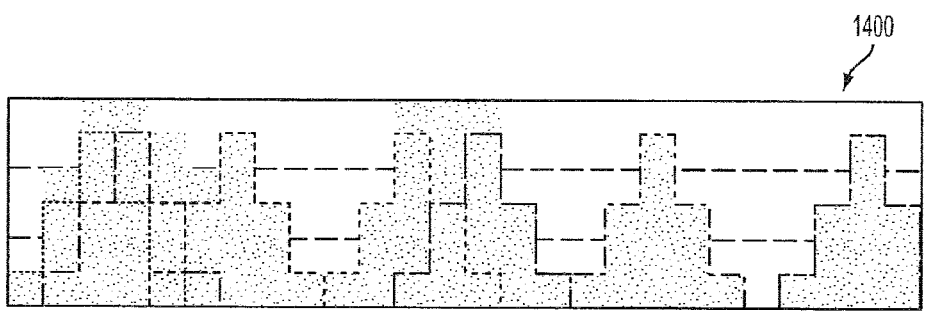
Figure 15:
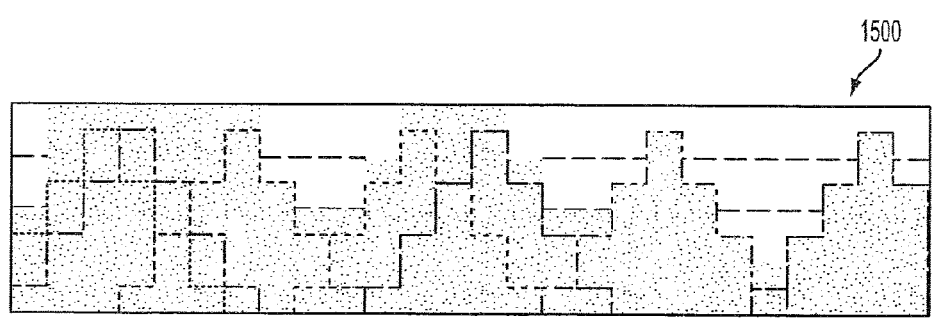

FIG. 11 shows a diagram 1100 of probabilities of user access and corresponding values of a session signature for different time slots, according to an embodiment of the present invention. Diagram 1100 includes a step-wise curve 1102 representing the probability that a user will access the service with device 804 as a function of time with time increasing from left to right. Lines 1104 indicate when device 804 generates a refresh request, and again the times between adjacent lines are indicative of the value of the session signature at those times. As shown in FIG. 11, curve 1102 rises until a line 1106, where the probability of the user using the device to access the service is highest during the shown time period, and then falls after line 1006. As curve 1102 increases, the time between adjacent lines 1104 decreases, indicating an increase in the refresh frequency.

In optional step 908, the session signature is smoothed. For example, in an embodiment in which the times at which the probabilities of user access are determined are time slots, the value of the session signature can be smoothed over multiple time slots. For example, in FIG. 8, pattern extractor 812 can smooth the session signatures across different time slots. For example, if two time slots that are separated by a single time slot, which both have high probabilities that a user will access the service during those time slots. The session signature across these three time slots can be smoothed so that there is a continuous change in refresh frequency between these time slots. In this example, the user likely did not stop using the device during the intermediate time slot; rather the user probably just did not interact with the device during this time slot. Accordingly, smoothing can provide a more accurate model of the user's behavior. In such an embodiment, the refresh frequency at the middle time slot is effectively increased and the values of the two other time slots are decreased. As would be appreciated by those skilled in the relevant arts based on the description herein, a smoothing operation can equivalently be executed on determined probabilities instead of the session signature.

FIGS. 12, 13, 14, and 15 show diagrams 1200, 1300, 1400, and 1500 representing session signatures having different levels of smoothing, according to embodiments of the present invention. Diagram 1200 represents a session signature without any smoothing. As shown in diagram 1200, certain time slots have a very high probability that the user will access the device, e.g., the slots that are filled in.

Diagram 1300 represents a session signature based on the same set of probabilities that the session signature represented in diagram 1200 was based on, with a one-slot smoothing technique. In this technique, the value of the session signature is smoothed across adjacent time slots in front of and behind a given time slot.

Diagrams 1400 and 1500 represent session signatures based on the same set of probabilities used to generate the session signature represented in diagram 1200 that have two-slot and three-slot smoothing techniques, respectively. In a two time slot smoothing technique, the session signature is smoothed across two time slots in front of and two time slots behind a particular time slot. Similarly, in a three-time slot smoothing technique, the value of the session signature is smoothed across three-time slots iii front of and three time slots behind a given session signature. As a number of time slots over which a session signature is smoothed increases, the session, signature becomes more and more uniform. Thus, the session signature becomes more and more similar to a simple period pulling technique. Thus, the number of time slots to smooth over should be chosen so that differences in the value of the session signature between different time slots are maintained.

In optional step 910, the session signature is updated based on one or more of a variety of criteria. For example, in FIG. 8, pattern extractor 812 can retrieve update information from update information module 814 to update the generated session signature. For example, pattern extractor 812 can update the generated session signature based on a load on server 802. For example, pattern extractor 812 can determine that at a particular time of day or day of a week, the load on server 802 is particularly high. Pattern extractor 812 can set the session signature to a relatively low refresh frequency at that time. In such manner, the load on server 802 can be reduced fit a further embodiment, updating the generated session signature can include updating the generated session signature based on the type of user that is using device 804. For example, values of the generated session signature can, be decreased more if the user is a non-enterprise user as opposed to an enterprise user.

In another embodiment, pattern extractor 812 can update the session signature based on a scheduled change in the behavior of the user. For example, the user may create an out-of-office, vacation, or other away message for the e-mail account provided by server 802. Pattern extractor 812 can use this message to determine that the user will travel. In such an embodiment, pattern extractor 812 can shift the session signature according to the time shift that the user will experience during the trip so that the session signature remains accurate in a different time zone.

In still another embodiment, pattern extractor 812 can update the session signature based on input received from the user. For example, the user may indicate that device 804 will likely be used to access the service provided by server 802 at certain particular times. Pattern extractor 812, then, can correspondingly increase the value of the session signature during these times.

In, optional step 912, the session signature is transmitted to a device. For example, in FIG. 9, server 802 can transmit a session signature stored in storage 816 to device 804. For example, server 802 can transmit the session signature to device 804 in response to a connection being formed between device 804 and server 802. For example, the connection between device 804 and server 802 can be established when a user uses device 804 to access the service being provided by server 802. In another embodiment, the session signature may be transmitted to device 804 along with updated information in response to a refresh request transmitted by device 804.

As described above, in embodiments in which a user uses multiple different devices to access the service provided by server 802, the steps of flowchart 900 can be repeated for each device. Thus, each device would receive its own respective session signature. Each of these devices, then, uses the session signature to map a particular time to a refresh frequency to determine when to transmit a refresh request.

Figure 16:
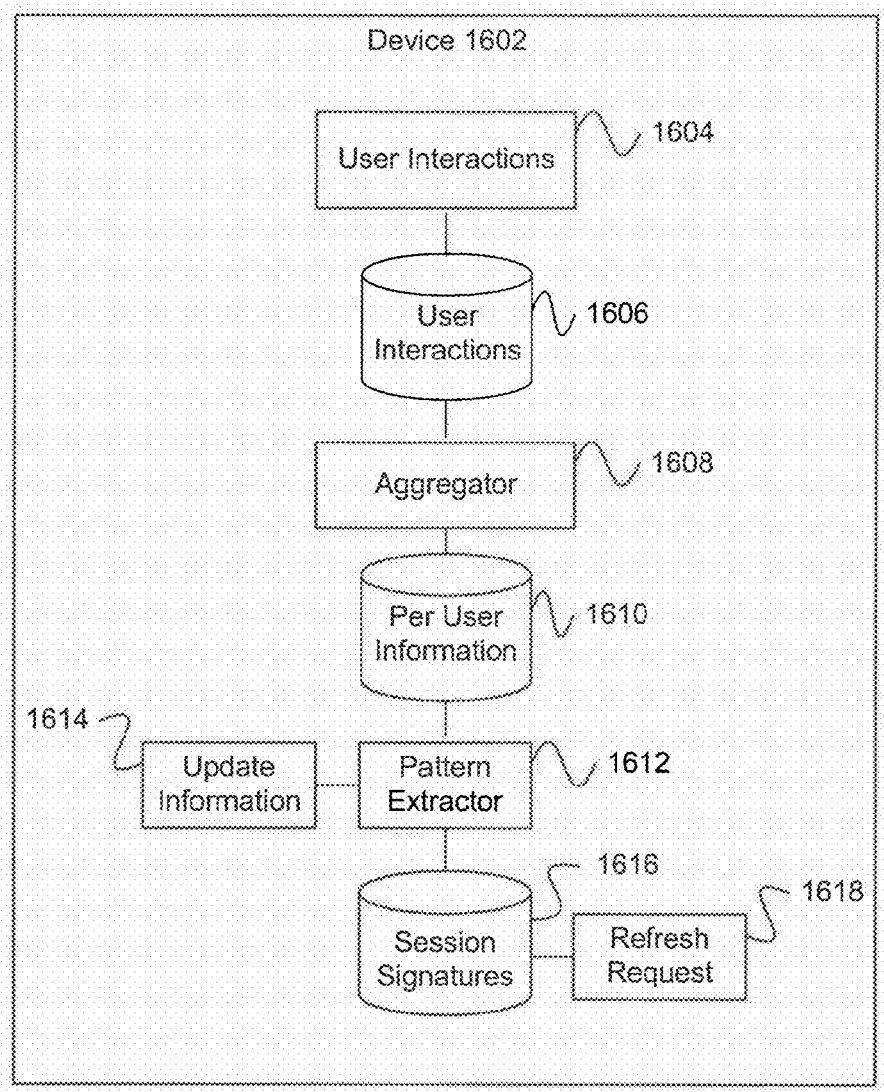
FIG. 16 shows a device configured to generate session signatures based on user interactions, according to an embodiment of the present invention.

In the embodiment of FIGS. 8 and 9, the session signature used by the device is generated at the server. In alternate embodiments, the session signature can be generated at the device. For example, FIG. 16 shows a device 1602 that generates session signatures based on user interactions, according to embodiments of the present invention.

Device 1602 includes a user interactions module 1604, storages 1606, 1610, and 1616, an aggregator 1608, a pattern extractor 1612, an update information module 1614, a storage 1616, and a refresh request module 1618. In an embodiment, user interactions module 1604, aggregator 1608, storage 1610, pattern extractor 1612, update information module 1614, storage 1616, and refresh request module 1618 operate in a manner substantially similar to user interactions module 826, storage 806, aggregator 808, storage 810, pattern extractor 812, update information module 814, storage 816, and refresh request module 822, as shown in FIG. 8 and described above. In the embodiment of FIG. 16, then, device 1602 is able to generate its own session signature and uses that session signature to generate refresh requests. In an embodiment, device 1602 can execute one or more of steps 902-910 of flowchart 900 to obtain a session signature.

Exemplary Results

Figure 17:
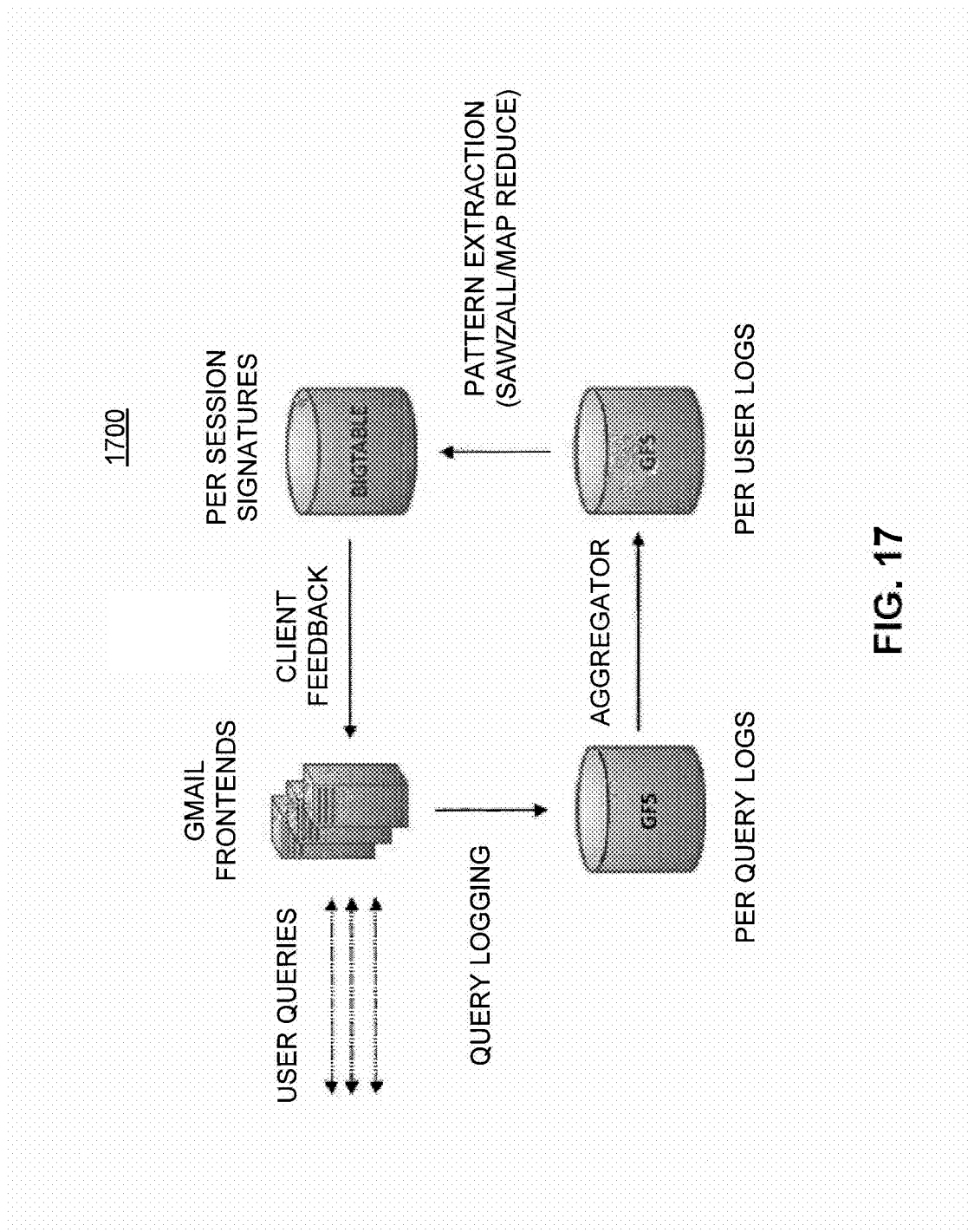
FIG. 17 shows a system used to analyze results of smart-sync, according to an embodiment of the present invention.

The different exemplary models were tested using the GMAIL service (described above). Both the per-click adaptive sync models and the practical slotted refresh model were analyzed by experimental evaluation on a large sample of user activity streams. The testing focused on two metrics: resource utilization with respect to the total number of refresh queries issued by any client device or session, and user satisfaction based on the instantaneous data sync lag experienced by the users. In this analysis, it was assumed that every refresh query consumes a fixed amount of resources in the client device, the network, and the server in the cloud. While not always accurate, the assumption does provide a simple means of analyzing the different adaptive sync models at a much higher abstraction: FIG. 17 shows a system 1700, similar to system 800 shown in FIG. 8, and described above; based on which the analysis was completed.

More specifically, the conventional periodic polling (uniform refresh) model was compared against the exemplary throttle or predict refresh models described above. For sparse user click distributions the growth rate was roughly linear in the total number of uncorrelated user clicks, while it was largely sub-linear for a denser distribution.

Figure 22A:
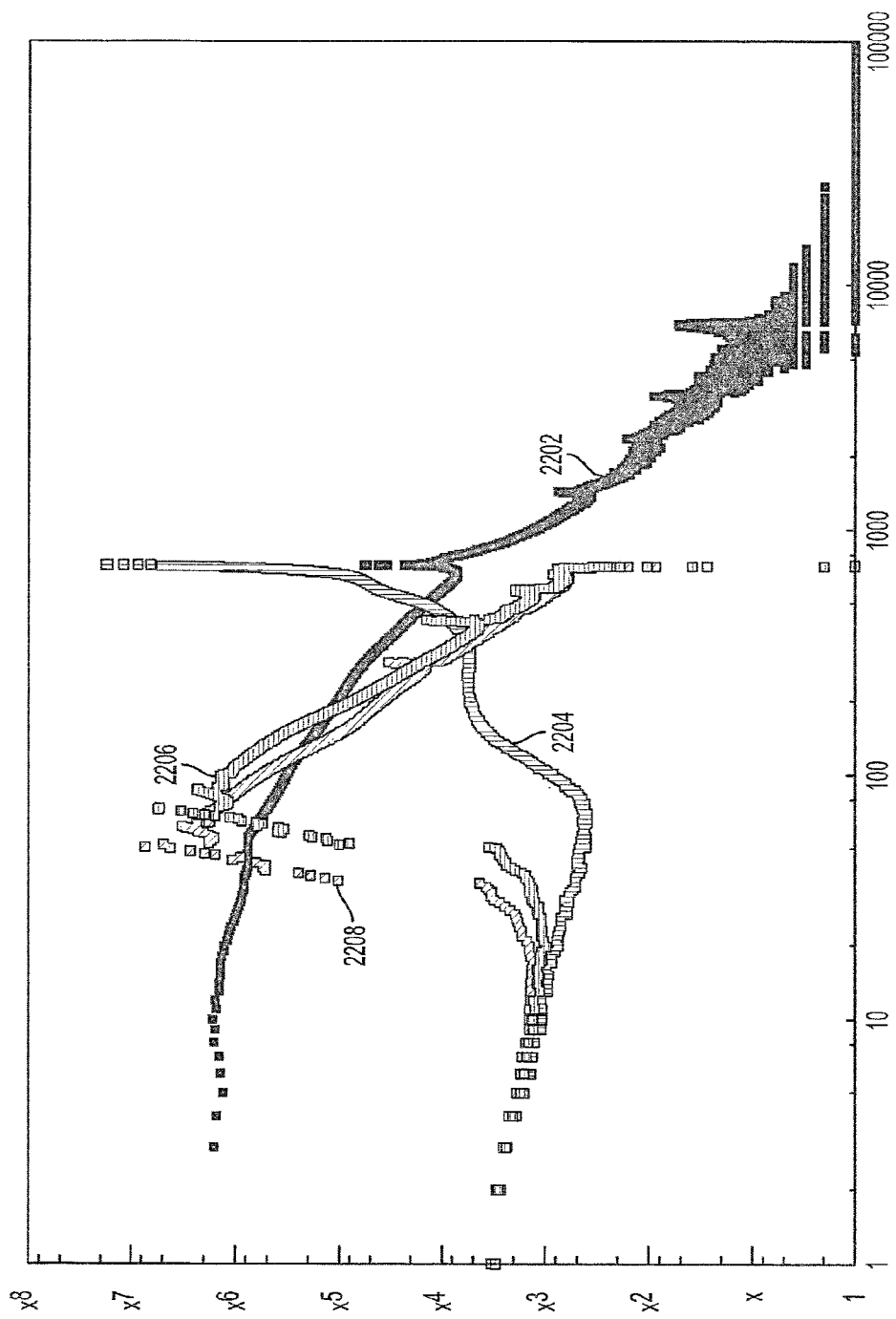
Figure 22B:
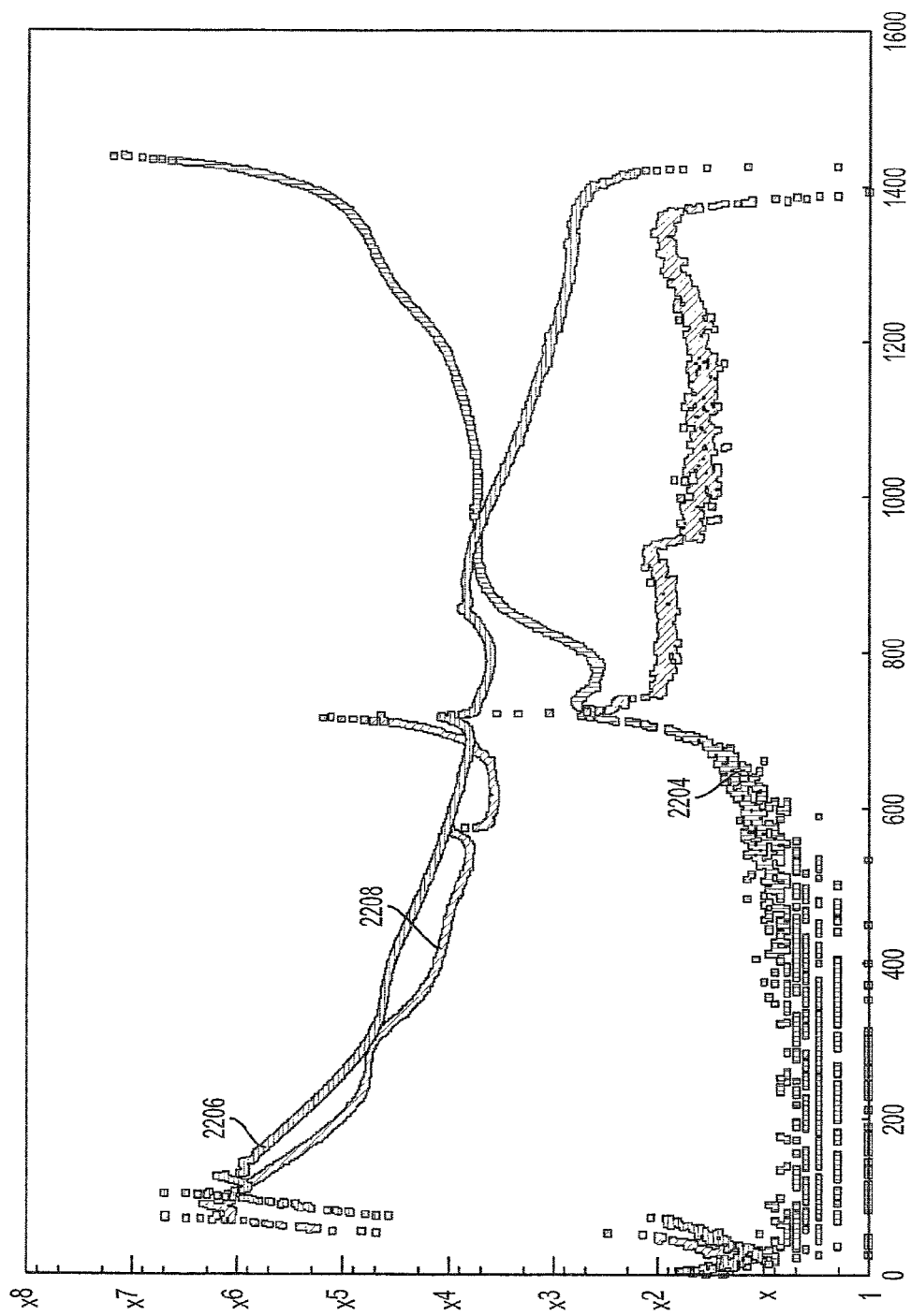
Figure 22C:
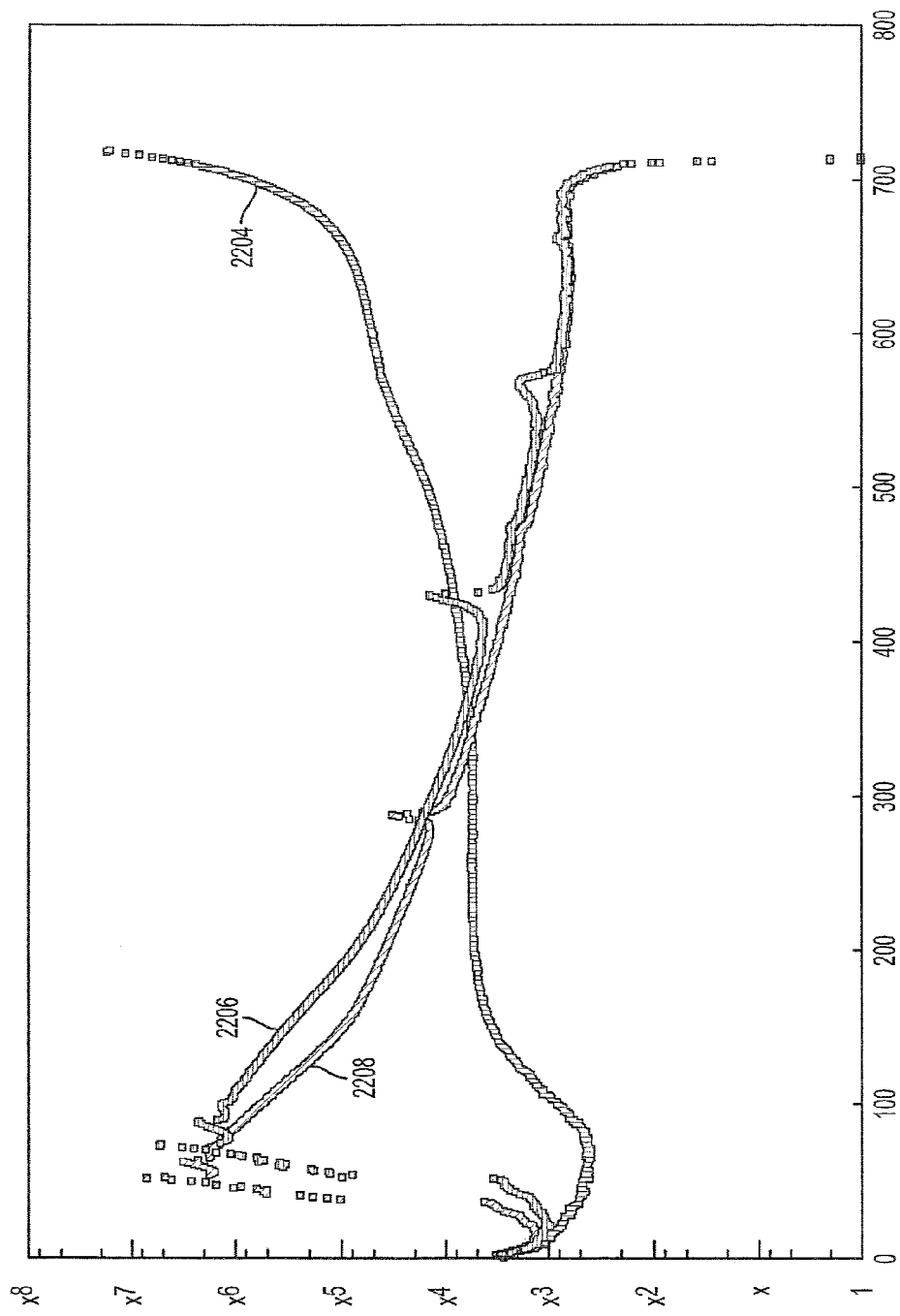

Resource Utilization: FIGS. 22a-d show query histograms, with plots 2202, 2204, 2206, and 2208 representing results obtained with manual clicks, uniform refresh, throttle refresh, and predict refresh, respectively. FIG. 22a shows the query histogram for all email service users measured over a 24-hour period. The (log-scale) x-axis represents the total number of queries, while the (log-scale) y-axis represents the number of users that generated the corresponding number of queries. The manual clicks closely followed a power law distribution with very few users showing very high user activity. FIGS. 22b and 22c depict the same background refresh query trends for the three per-click models with a linear scale x-axis and different minimum refresh intervals. The uniform refresh curve having a positive slope may provide a non-scalable model to support an ever-expanding user base and emerging trends in higher device spread and lower time persistence. On the other hand, the throttle and predict refresh curves both having a negative slope may provide a more scalable model, with fewer users requiring a high number of background queries. While the predict refresh curve closely tracked the throttle refresh curve for the longer interval here, it showed a greater divergence for the shorter interval. This behavior can be attributed to the specific user click distributions and refresh interval durations included in this analysis. This variance of this behavior may make it difficult to postulate a reasonable generalization of this trend.

Figure 22D:
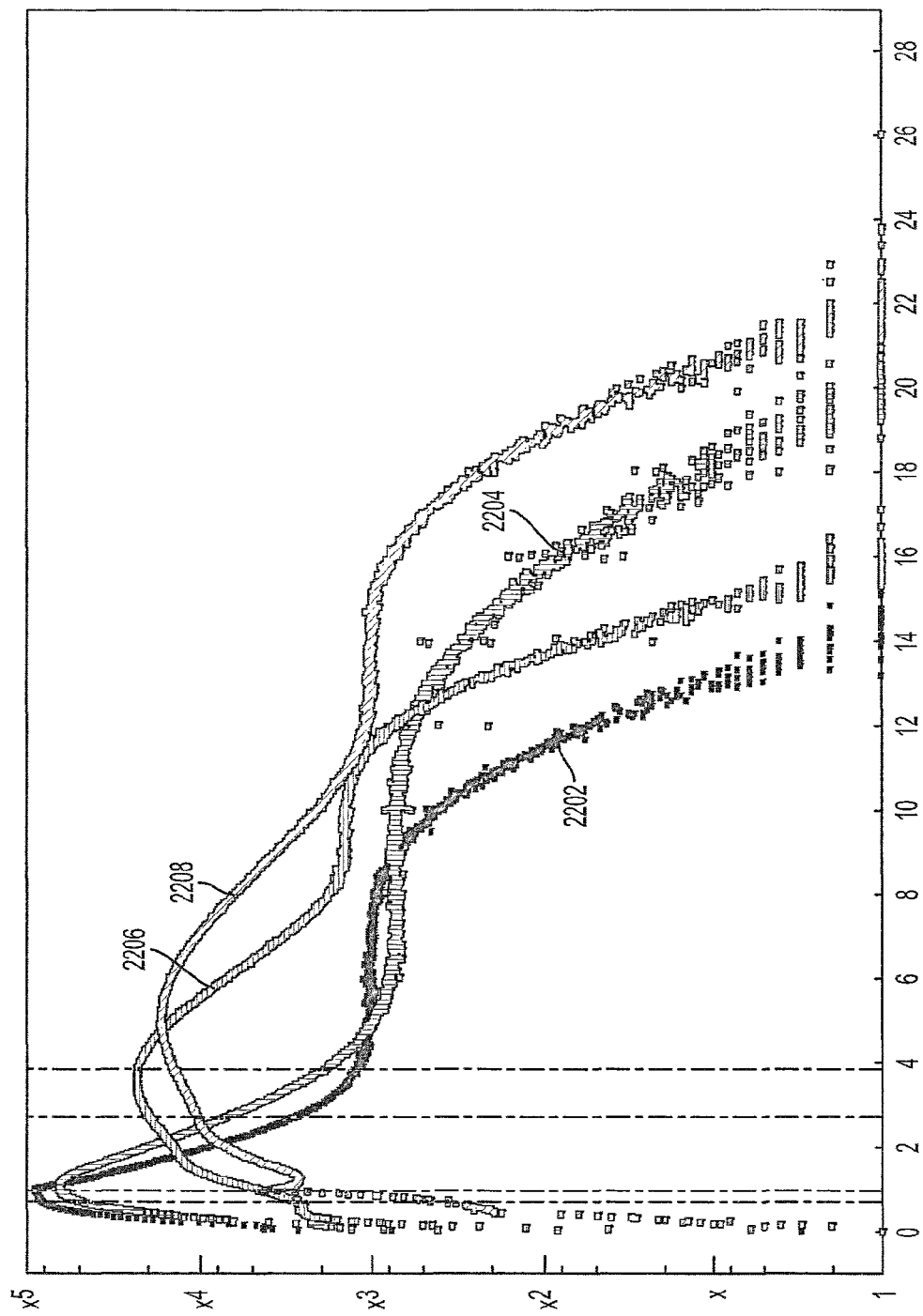

User Satisfaction: User satisfaction or data coherence, was measured by measuring that content sync lag at any user click time instant. A lower data sync lag provides greater data coherence, and, hence better user satisfaction. While the uniform and predict refresh models consume more resources, they bound the maximum (user-perceived) sync lag to predetermined values, and hence provide greater control over data coherence. On the other hand, the throttle refresh model provides greater resource savings at the cost of potentially unbounded sync lag—not only across different sessions, but also across user clicks within a single session. FIG. 22d shows the (throttle refresh) delay histogram for all user sessions, the x-axis representing the sync lag (in minutes) and the (log-scale) y-axis representing the number of users experiencing the corresponding sync lag. The shorter interval refreshes naturally provide a better data coherence. Thus, very few users experienced a large sync lag. While the mean and standard deviation of sync lags both display a wide spread, their average values across all user sessions is about 2-4 minutes, thus providing enhanced user satisfaction.

Thus, the throttle refresh model that provides no maximum sync lag did a reasonably good job of maintaining good data coherence. To summarize, while the uniform and predict refresh models provided fine-grained control over user-perceived data sync lag, the throttle refresh model behaved more like a best effort model with a few outliers. While throttle refresh would have sufficed for casual users, in some embodiments, the predict refresh model for the business or power users may have been best. The extra incentive of a relatively smaller data sync lag was delivered at slightly higher resource costs for the service provider.

In testing the more practical exemplary models (e.g., slotted refresh), daily user click activity was aggregated into 15-minute time intervals. Each session signature thus tracked 96 independent user access probability values. To discard spurious one-off user sessions and to manage the storage requirements for caching multiple user session signatures, limits on the number of session signatures that were being tracked on a per-user basis can be provided using a suitable cache expiry mechanism. A least recently used (LRU) policy can discard user behavior trends gathered over time in favor of recent anomalous behavior due to travel, vacation, etc. A least frequently used (LFU) policy biases retention towards, long-lived session signatures and may not reflect emerging user access trends. An adaptive replacement cache (ARC) policy can be used to manage the global session signature database for all email service users.

Resource Utilization: FIGS. 23a-b shows a query histogram for all email service users for the different window smoothing sizes, where the (log-scale) x-axis and (log-scale) y-axis represent the number of queries and the number of users that generated the corresponding number of queries, respectively. Specifically, FIG. 23a-b show plots 2302, 2304, 2306, 2308, 2310, and 2312 corresponding to a manual click and window smoothing sizes 1 time slot, 3 time slots, 5 time slots, 7 time slots, and 9 time slots, respectively.

The background refresh queries here showed a similar negative-slope as the per-click models discussed previously. FIG. 23b shows a slight shift in the waveform shape as the window spread factor size increases. This trend shows that while the higher window spread factor size increased the click probability in neighboring time intervals, it also scaled down the relative click probability in the current time interval. The net effect of the specific nature of probability scaling and (window) spreading in this case yields lower update prefetches as the window spread factor increased. Additionally, the exponentially weighted moving average smoothing also played a role in both probability scaling and variations in the number of expected refresh queries for preemptive data sync.

Determining the optimal window spread factor for a user can be difficult because of the many indirect dependencies described above. However, in one embodiment, a periodic window spread tightening concept is used. In this concept, a high probability spread is bootstrapped, and then the adapted click probability distribution is relatively tightened every few weeks. As the session signature correlation across multiple days decreases, a smaller window spread tightening provided, and vice versa. This concept is shown in FIG. 24 with curves 2402-2408. While this optimization is optional, it does provide incrementally higher benefits.

User Satisfaction The effect of the different window spread factor sizes on user-perceived data sync lag was measured. FIG. 23c shows a delay histogram for all user sessions, the x-axis representing the sync lag (in minutes) and the (log-scale) y-axis representing the number of users experiencing the corresponding sync lag. Better data coherence was achieved for smaller window spread factor sizes. This pattern can be explained on the basis of relative probability scaling similar to as discussed above. Specifically, FIG. 23c shows plots 2314, 2316, 2318, 2320, and 2322 corresponding to a mean sync lag with 1 window smoothing, a mean sync lag with 5 window smoothing, a mean sync lag with 0.9 window smoothing, a standard deviation of sync lag with 1 window smoothing, a standard deviation of sync lag with 5 window smoothing, and a standard deviation of sync lag with 9 window smoothing, respectively. While the mean and standard deviation of sync lag both displayed a wide spread, their average values across all user sessions was less than a minute, thereby achieving increased user satisfaction levels.

To summarize, the exemplary embodiments vastly outperformed the conventional periodic polling mechanism. Among the different embodiments of adaptive sync models, the slotted refresh model may provide the most practical way of achieving better resources utilization and higher user satisfaction. The one-size fits all approach may not always work. Specifically, different cloud-based applications might benefit from different models and appropriate choices can be made by detailed analysis of the individual application requirements and their corresponding user traffic patterns. Indeed, in some situations, a superior, but complex model may not be the most prudent choice with respect to scalability concerns.

Conclusion

Web applications today have greatly evolved to provide users instantaneous access to their personalized data from any device/location and in any form with extreme ease. The ability to provide better scalability, reliability, availability and security guarantees without any explicit user contribution/ knowledge has increased the usability of cloud-based applications multi-fold. While users today have come to expect seamless data migration across their many devices, various technological constraints with respect to high data coherence and better data synchronization do impose certain barriers. The conventional approach of periodic data fetch by the clients from the different servers in the cloud can face limitations with respect to scalability and prohibitively high costs.

A higher data refresh rate can impose higher costs, but can also result in higher user satisfaction. Conversely, a lower data refresh rate can, result in lower costs, and correspondingly lower the user satisfaction. An optimal data refresh rate then can be thought of as the "sweet" spot along the entire spectrum that achieves the right balance between the two metrics. In embodiments described herein, systems determine a pattern for individual user behavior based on past access patterns. In doing so future predictions for user access can be derived with high confidence, so that preemptive/throttled data sync can be achieved. Along these lines, individual user clicks (probabilities) are aggregated into small light-weight session signatures. Adaptive sync schedules that can provide higher intra-day and inter-day data coherence in addition to efficient resource utilization can then be used. An experimental evaluation of a large sample of email service user activity streams validates the approach.

Exemplary embodiments of the present invention have been presented. The invention is not limited to these example. These examples are presented herein for purposes of illustration, and not limitation. Alternatives (including equivalents, extensions, variations, deviations, etc., of those described, herein) will be apparent to, persons skilled in the relevant art(s) based on the teachings contained herein. Such alternatives fall within the scope and spirit of the invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of synchronizing data between a server and a plurality of devices of a user, the server configured to provide a service over a network to the plurality of devices, comprising:

receiving, at the server, user interaction information associated with at least one user interaction with each of the plurality of devices, wherein the user interaction information received includes at least one of user interaction type, time, and date when the at least one user interaction occurred;

aggregating, at the server, the user interaction information on a per-user basis and on a per-device basis;

determining, at the server, a first probability that at a first given time the user will access the service provided by the server across the plurality of devices and a second probability that the user will access the service provided by the server at a second given time using each device, wherein the first and second probabilities are determined based at least in part on frequencies associated with the at least one user interaction with each of the plurality of devices;

generating, at the server, a session signature for each device based on the the first or second probability, wherein the session signature maps the given time of each respective device to a refresh frequency;

transmitting, from the server, the generated session signature to a respective device;

receiving, at the server, a refresh request based on the generated session signature, the refresh request being associated with first data;

transmitting, from the server, only the first data associated with the refresh request to the respective device; and receiving, at the server, a disconnect request.

2. The method of claim 1, wherein the first or second time is an instance in time.

3. The method of claim 1, wherein the first or second time is a time slot.

4. The method of claim 3, wherein the at least one user interaction is a first user interaction, further comprising:

determining a length of the time slot based at least on information identifying a second user interaction, wherein the second detected user interaction occurred before or after the first user interaction.

5. The method of claim 3, wherein the time slot is a first time slot, further comprising:

smoothing, at the server, the session signature over the first time slot and a second time slot.

6. The method of claim 5, wherein the second time slot is before or after the first time slot.

7. The method of claim 5, wherein smoothing comprises:

increasing, at the server, a value of the session signature associated the second time slot and decreasing a value of the session signature associated with the first time slot.

8. The method of claim 7, wherein the first and second slots are separate by zero, one, or two time slot periods.

9. The method of claim 1, further comprising:

updating, at the server, the session signature based on a load on the server.

10. The method of claim 9, wherein updating comprises:

updating the session signature based on whether the user is an enterprise user or a non-enterprise user.

11. The method of claim 1, further comprising:

updating the session signature based on a change in a pattern of user interactions.

12. The method of claim 1, wherein the refresh request is a first refresh request, further comprising:

transmitting a response to the first refresh request or a second refresh request, wherein the response includes the session signature.

13. The method of claim 1, further comprising:
updating, at the server, the session signature based on input received from the user using at least one of the plurality of devices.

14. A method of synchronizing data between a server and a plurality of devices of a user, comprising:
detecting, at each device of the plurality of devices, at least one user interaction with each of the plurality of devices, wherein the same user is associated with each of the plurality devices via a user identification;
sending, to a server, information about each of the at least one user interactions, wherein the information sent to the server includes at least one of user interaction type, time, and date when the at least one user interaction occurred;
receiving, from the server, a session signature for each device, wherein the session signature for each device is based on a first probability that at a given time the user will access a service provided by the server across the plurality of devices and a second probability that the user will access the service provided by the server at the given time using each device, and the session signature maps the given time to a corresponding refresh frequency;
transmitting a refresh request to the server based on the received session signature, the refresh request being associated with first data;
receiving, from the server, only the first data associated with the refresh request; and
transmitting a disconnect request to the server.

15. The method of claim 14, wherein the refresh frequency is an elapsed time since the at least one user interaction.

16. A server, comprising:
a storage configured to store user interaction information associated with at least one user interaction with each of a plurality of devices;
an aggregator configured to aggregate the user interaction information in the storage on a per-user basis and per-device basis; and
a pattern extractor configured to:
determine a first probability that at a given time the user will access a service provided by the server across the plurality of devices and a second probability that the user will access the service provided by the server at a second given time using each device; and
generate a session signature based on the first or second probability; and
a transmission module configured to:
transmit the generated session signature to a respective device;
receive a refresh request based on the generated session signature, the refresh request being associated with first data;
transmit only the first data associated with the refresh request to the respective device; and
receive a disconnect request.

17. A system for facilitating synchronization of data between a server and a plurality of devices, comprising:
a user interaction module to detect at least one user interaction with each of the plurality of devices by a user with a unique user identification;
a storage configured to store information regarding the at least one user interaction with each device on a per-user basis and per-device basis; and
a refresh request module configured to:
receive, from the server, a session signature, wherein the session signature is based on a first probability that at a given time the user will access a service provided by the server via any of the plurality of devices associated with the unique user identification and a second probability that the user will access the service provided by the server at the given time using each device, and the session signature maps the given time to a corresponding refresh frequency;
transmit a refresh request to the server based on the received session signature, the refresh request being associated with first data;
receive, from the server, only the first data associated with the refresh request; and
transmit a disconnect request to the server.

* * * * *